US012671109B2

(12) United States Patent     (10) Patent No.: US 12,671,109 B2

Muratsu et al.     (45) Date of Patent: Jun. 30, 2026

---

(54) BATTERY

(71) Applicant: Panasonic Intellectual Property Management Co., Ltd., Osaka (JP)

(72) Inventors: Jiro Muratsu, Osaka (JP); Hirotaka Ogino, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 797 days.

(21) Appl. No.: 17/629,884

(22) PCT Filed: Jul. 29, 2020

(86) PCT No.: PCT/JP2020/028964

§ 371 (c)(1),
(2) Date: Jan. 25, 2022

(87) PCT Pub. No.: WO2021/020413

PCT Pub. Date: Feb. 4, 2021

(65) Prior Publication Data

US 2022/0255121 A1     Aug. 11, 2022

(30) Foreign Application Priority Data

Jul. 31, 2019   (JP) ................................. 2019-140869
Jul. 31, 2019   (JP) ................................. 2019-140875

(51) Int. Cl.
H01M 50/107     (2021.01)
H01M 10/0525     (2010.01)
(Continued)

(52) U.S. Cl.
CPC ..... H01M 10/0525 (2013.01); H01M 50/107 (2021.01); H01M 50/186 (2021.01); H01M 50/559 (2021.01)

(58) Field of Classification Search
CPC ............. H01M 50/107; H01M 50/186; H01M 50/559; H01M 10/0525
See application file for complete search history.

(56) References Cited

U.S. PATENT DOCUMENTS 3,064,065 A * 11/1962 Belove ................ H01M 50/174
                                                  429/185
2009/0111017 A1   4/2009 Kim
(Continued)

FOREIGN PATENT DOCUMENTS

JP          58-150269 U    10/1983
JP          10-27599 A     1/1998
(Continued)

OTHER PUBLICATIONS

Extended (Supplementary) European Search Report dated Dec. 5, 2022, issued in counterpart EP application No. 20846921.3. (9 pages).
(Continued)

*Primary Examiner* — Kenneth J Douyette
(74) *Attorney, Agent, or Firm* — WHDA, LLP

(57)     ABSTRACT

This battery comprises an electrode body, an outer package, an opening sealing element, and an auxiliary electrode. The auxiliary electrode has: a first joint part that is welded to an outer circumferential surface of a cylindrical part of the outer package; a plate-like first upward extension part that extends from the first joint part toward the side of an open end of the outer package; and a plate-like external connection part that extends from the first upward extension part in a direction different from that of the first upward extension part so as to be connected to another conductor member. The cylindrical part has a groove in which an outer circumferential surface is indented in such a manner as to make an inner circumferential surface protrude.

7 Claims, 17 Drawing Sheets

(51) Int. Cl.
    *H01M 50/186*       (2021.01)
    *H01M 50/559*       (2021.01)

(56)            References Cited

U.S. PATENT DOCUMENTS

| | | |
|---|---|---|
| 2011/0171515 A1 | 7/2011 | Itoi et al. |
| 2016/0181579 A1* | 6/2016 | Geshi .................. H01M 50/581 |
| | | 429/61 |
| 2019/0097203 A1 | 3/2019 | Kwag et al. |

FOREIGN PATENT DOCUMENTS

| | | |
|---|---|---|
| JP | 2009-252351 A | 10/2009 |
| JP | 5256821 B2 | 8/2013 |

OTHER PUBLICATIONS

International Search Report dated Oct. 20, 2020, issued in counter-part International Application No. PCT/JP2020/028964 (2 pages).

\* cited by examiner

BATTERY

CROSS-REFERENCE TO RELATED APPLICATION

This application is a National Phase Application filed under 35 U.S.C. § 371 of International Application No. PCT/JP2020/028964 filed on Jul. 29, 2020 which claims the benefit of priorities under 35 U.S.C. § 119(a) of Japanese Patent Applications No. 2019-140875 filed in Japan on Jul. 31, 2019 and No. 2019-140869 filed in Japan on Jul. 31, 2019, the contents of which are incorporated herein by reference.

TECHNICAL FIELD

The present disclosure relates to a battery.

BACKGROUND ART

In recent years, batteries such as lithium ion secondary batteries have been used as power sources for electric vehicles (EVs), large power storage facilities, and the like. When a battery is used as a power source for an EV, a power storage facility, or the like, a large number of batteries may be electrically connected and used as a module. For example, a large number of batteries may be electrically connected in series and in parallel for modularization. Therefore, it is conceivable to collect a current on one end side of a plurality of batteries.

Patent Literature 1 describes a configuration in which, in one of two batteries, a connection plate is connected to an outer circumferential surface of a cylindrical part, which is one electrode terminal, via a bracket by welding, and a terminal board is connected to the sealing assembly, which is the other electrode terminal. In the other battery of the two batteries, the connection plate is connected to an outer circumferential surface of a cylindrical part, and the connection plate is connected to the terminal board of the one battery, so that the two batteries are electrically connected to each other.

CITATION LIST

Patent Literature

PATENT LITERATURE 1: Japanese Patent No. 5256821

SUMMARY

Technical Problem

In order to collect a current on one end side of the battery, it is conceivable that a part of an auxiliary electrode is joined to the outer circumferential surface of the cylindrical part which is one of the electrode terminals by welding, the auxiliary electrode is extended above an open end of the cylindrical part, and a portion extending in the direction different from the extending direction of the auxiliary electrode is connected to another conductive member. In this case, it is desired that a thermal influence when joining the auxiliary electrode to the cylindrical part by welding is less likely to exert to the internal electrode assembly. In addition, in a case where a groove having an outer circumferential surface dented so as to protrude an inner circumferential surface inward is formed in the cylindrical part, a gasket is disposed on the groove, and the open end of an outer package is closed by the gasket and the sealing assembly, it is also desired that a thermal influence at the time of welding is less likely to exert to the portion on the open end side of the gasket.

It is an advantage of the present disclosure to suppress a thermal influence at the time of welding on a portion on an open end side of a gasket and an electrode assembly in a battery having a configuration in which an auxiliary electrode is welded to an outer circumferential surface of a cylindrical part of an outer package.

Solution to Problem

The battery that is an aspect of the present disclosure is a battery comprising: an electrode assembly obtained by winding a first electrode and a second electrode with a separator therebetween; an outer package that has a cylindrical part having a cylindrical shape, an open end formed at one end of the cylindrical part, and a bottom closing the other end of the cylindrical part, and that stores the electrode assembly therein, and that is electrically connected to the first electrode; a sealing assembly that closes the open end of the outer package together with a gasket, and is electrically connected to the second electrode; and an auxiliary electrode having a first joint part that is welded to an outer circumferential surface of the cylindrical part, a plate-shaped first upward extension part that extends from the first joint part toward the open end, and a plate-shaped external connection part that extends from the first upward extension part in a direction different from a direction of the first upward extension part, and is connected to another conductive member, wherein the cylindrical part has a groove having the outer circumferential surface dented so as to protrude an inner circumferential surface of the cylindrical part, the sealing assembly is disposed on the groove with the gasket therebetween, and the first joint part is joined to at least one of the groove, and a portion of the outer circumferential surface of the cylindrical part located between the groove and the electrode assembly. In the present disclosure, "upper" is the side of the open end of the cylindrical part of the battery, and "lower" is the bottom side.

Advantageous Effect of Invention

According to a battery of the present disclosure, the battery has a configuration in which an auxiliary electrode is welded to an outer circumferential surface of a cylindrical part of an outer package, and it is possible to suppress a thermal influence at the time of welding on a portion on an open end side of a gasket and an electrode assembly.

DESCRIPTION OF EMBODIMENTS

Figure 1:
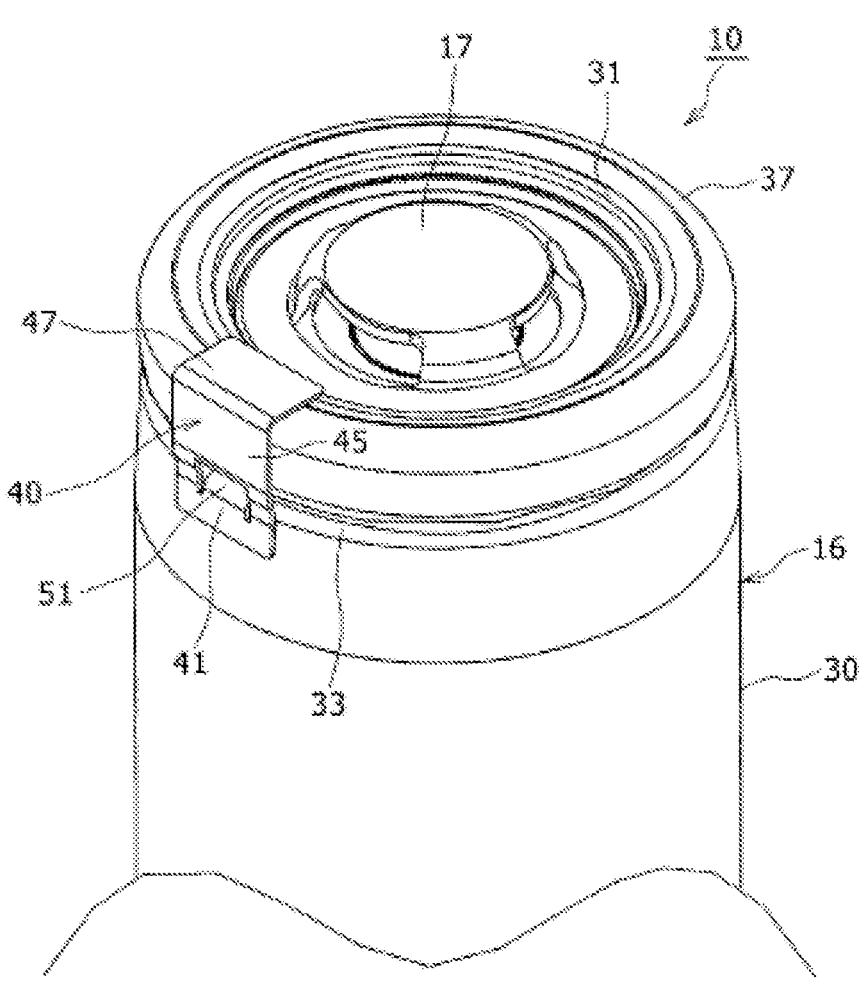
FIG. 1 is a perspective view illustrating an extracted upper side portion of a battery in an example (first example) of an embodiment.

Hereinafter, an example of an embodiment will be described in detail. The drawings referred to in the description of the embodiment are schematically illustrated, and therefore the specific dimensions and the like of each component should be determined in consideration of the following description. In this specification, the term "approximately" is intended to include not only completely the same but also substantially the same when the approximately same is explained as an example. The shapes, materials, numbers and numerical values described below are examples for explanation, and can be appropriately changed depending on the use of a battery. In the following, equivalent elements will be described with the same reference numerals in all the drawings.

First Example of Embodiment

FIG. 1 is a perspective view of an upper side portion of a battery 10 in an example (first example) of an embodiment.

Figure 2:
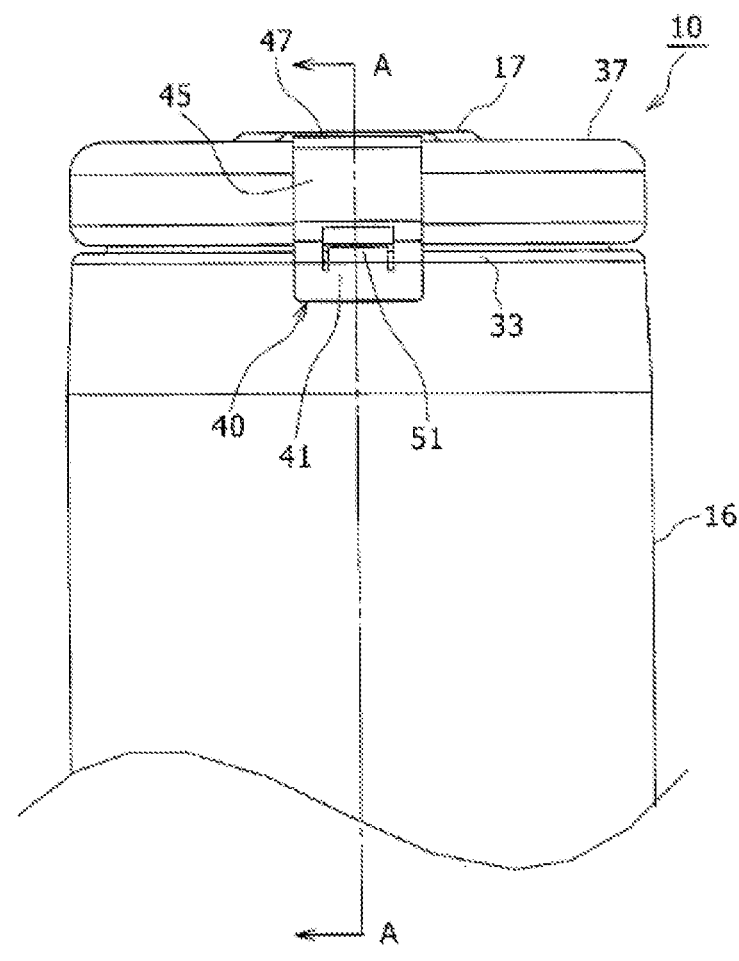
FIG. 2 is a front view of the battery of FIG. 1.
Figure 3:
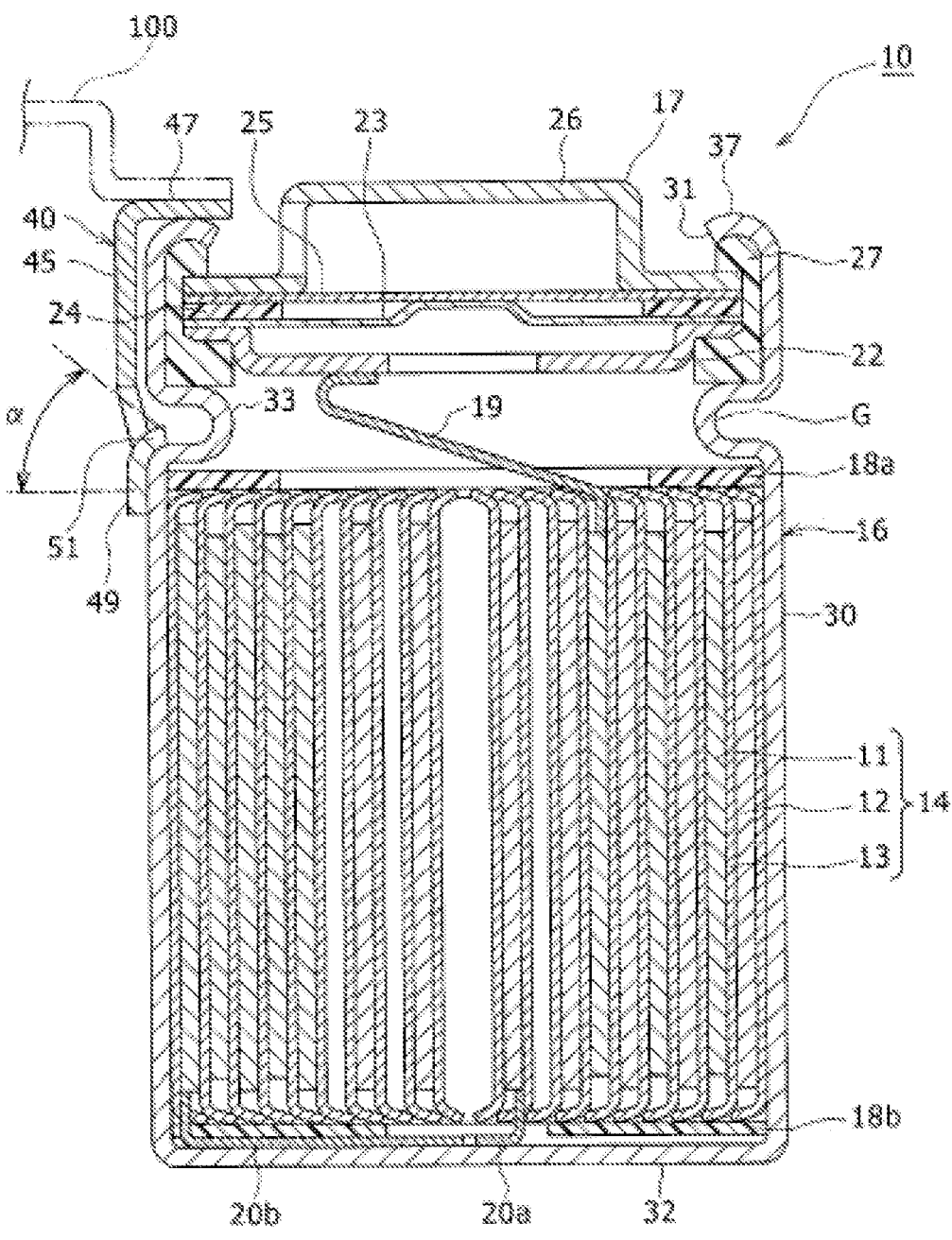
FIG. 3 is a cross-sectional equivalent view taken along the line A-A of FIG. 2 illustrating the exaggerated thickness of constituent members of the battery.

FIG. 2 is a front view of the battery 10. FIG. 3 is a cross-sectional equivalent view taken along the line A-A of FIG. 2 illustrating the exaggerated thickness of constituent members of the battery 10.

As illustrated in FIG. 1 to FIG. 3, the battery 10 comprises an outer package 16, a sealing assembly 17, and an auxiliary electrode 40. The battery 10 is, for example, a non-aqueous electrolyte secondary battery. As illustrated in FIG. 3, an electrode assembly 14 and a non-aqueous electrolyte (not illustrated) are stored in the outer package 16. The electrode assembly 14 has a positive electrode 11, a negative electrode 12, and a separator 13, and the positive electrode 11 and the negative electrode 12 are spirally wound with the separator 13 therebetween. In the battery 10, the positive electrode 11 corresponds to a second electrode, and the negative electrode 12 corresponds to a first electrode. In FIG. 3, in order to facilitate understanding of the arrangement relationship among the positive electrode 11, the negative electrode 12, and the separator 13 in the electrode assembly 14, all the positive electrode, the negative electrode, and the separator are exaggerated by being illustrated in large size. Therefore, the battery of the present disclosure is not limited to the number of windings of the electrode assembly 14 in FIG. 3. The positive electrode 11, the negative electrode 12, and the separator 13 constituting the electrode assembly 14 are each formed in a band shape, and are wound to be alternately laminated in the radial direction of the electrode assembly 14.

The non-aqueous electrolyte includes a non-aqueous solvent and an electrolyte salt dissolved in the non-aqueous solvent. The non-aqueous electrolyte is not limited to a liquid electrolyte, and may be in the form of a gel or a solid. In the following, the opening side of the outer package 16 of the battery 10 will be referred to as "upper" and the bottom side will be referred to as "lower".

As illustrated in FIG. 3, a positive electrode lead 19 that electrically connects the positive electrode 11 and the sealing assembly 17 (positive electrode terminal) is provided, for example, at approximately the center of a winding inner end portion and a winding outer end portion of the electrode assembly 14, and extends from an upper end of the electrode assembly 14. Negative electrode leads 20a, 20b that electrically connect the negative electrode 12 and the outer package 16 (negative electrode terminal) are provided at, for example, the winding inner end portion of the electrode assembly 14 and the winding outer end portion of the electrode assembly 14, respectively, and extends from a lower end of the electrode assembly 14. A plurality of the positive electrode leads 19 may be provided, and the number of each of the negative electrode leads 20a, 20b to be provided may be only one, or three or more.

The outer package 16 is a metal container having a cylindrical part 30 having a cylindrical shape, an open end 31 formed at one end of the cylindrical part 30, that is, an upper end, and a bottom 32 (FIG. 3) that closes the other end of the cylindrical part 30, that is, a lower end of the cylindrical part 30. The outer package 16 stores the electrode assembly 14 and the non-aqueous electrolyte, and is electrically connected to the negative electrode 12. Therefore, in the negative electrode 12, the negative electrode leads 20a, 20b extend toward the bottom 32 of the outer package 16 and are connected to an inner surface of a bottom of the outer package 16 by welding. In the battery 10, the outer package 16 becomes a negative electrode terminal. The outer package 16 is formed by drawing metal such as steel, iron, aluminum, copper, and nickel.

The sealing assembly 17 closes the open end 31 of the outer package 16 together with a gasket 27 described later, and is electrically connected to the positive electrode 11. The sealing assembly 17 and the outer package 16 constitutes a battery case. Insulating plates 18a, 18b are provided on the upper and lower sides of the electrode assembly 14, respectively. The positive electrode lead 19 is connected to the positive electrode 11, and extends outward in the winding axis direction of the electrode assembly 14. Then, the positive electrode lead 19 extends toward the sealing assembly 17 through a through hole of the insulating plate 18a and is welded to a lower surface of a filter 22 which is a bottom plate of the sealing assembly 17. In the battery 10, a cap 26 which is a top plate of the sealing assembly 17 and is electrically connected to the filter 22 serves as a positive electrode terminal.

The gasket 27 is provided between the outer package 16 and the sealing assembly 17, ensures sealability of the inside of a battery case 15, and electrically insulates the outer package 16 and the sealing assembly 17. The cylindrical part 30 of the outer package 16 has a groove 33 which has an outer circumferential surface dented so as to protrude an inner circumferential surface of the cylindrical part 30 inward. The groove 33 is formed, for example, by pressing the cylindrical part 30 from the outside. The sealing assembly 17 is disposed on the groove 33 with the gasket 27 therebetween so as to be supported. The groove 33 is formed annularly along the circumferential direction of the cylindrical part 30. An upper end portion 37 that forms the open end 31 of the outer package 16 is bent inward in the radial direction so as to press the gasket 27 from above.

In the sealing assembly 17, the filter 22, a lower vent member 23, an insulating member 24, an upper vent member 25, and the cap 26 are laminated in this order from the electrode assembly 14 side. Each member constituting the sealing assembly 17 has, for example, a disk shape or a ring shape, and the respective members except the insulating member 24 are electrically connected to each other. The lower vent member 23 and the upper vent member 25 are connected to each other at the central portion of each of the lower vent member 23 and the upper vent member 25, and the insulating member 24 is interposed between circumferential edges of the lower vent member 23 and the upper vent member 25. The lower vent member 23 is provided with a ventilation hole, and therefore when the internal pressure of the battery rises for some reasons, the upper vent member 25 swells toward the cap 26 and separates from the lower vent member 23, so that the electrical connection between the lower vent member 23 and the upper vent member 25 is interrupted. When the internal pressure further rises, the upper vent member 25 breaks, and gas is discharged from the opening of the cap 26.

The configuration of the positive electrode 11, the negative electrode 12, and the separator 13 will be described in detail. The positive electrode 11 comprises a strip-shaped positive electrode core body and a positive electrode mixture layer. The positive electrode mixture layer includes a positive electrode active material and a binder, and is formed on the positive electrode core body. An example of a suitable positive electrode core body is metal foil containing aluminum or an aluminum alloy as a main component. The thickness of the positive electrode core body is, for example, 5 μm to 30 μm. The positive electrode lead 19 is connected to a side surface of a portion where a surface of the positive electrode core body is exposed in the upper end portion of the positive electrode 11.

The positive electrode mixture layer is preferably formed on both side surfaces in the thickness direction of the positive electrode core body. The positive electrode mixture layer includes, for example, a positive electrode active material, a binder, and a conductive agent. The positive electrode 11 includes a positive electrode active material, a binder, a conductive agent, and a solvent such as N-methyl-2-pyrrolidone (NMP), and can be produced by applying positive electrode mixture slurry to both surfaces of the positive electrode core body and compressing a coating film.

The positive electrode 11 is capable of intercalating lithium ions. For this reason, examples of the positive electrode active material can include a lithium-containing transition metal oxide containing transition metal elements such as Co, Mn, and Ni. The lithium-containing transition metal oxide is not particularly limited, but is preferably a complex oxide represented by the general formula $Li_{1+x}MO_2$ (in the formula, $-0.2 < x \leq 0.2$, M includes at least one of Ni, Co, Mn and Al). Examples of the conductive agent can include a carbon material such as carbon black, acetylene black, ketjen black, and graphite. These may be used alone or in combination of two or more.

Examples of the binder can include fluororesin such as polytetrafluoroethylene (PTFE) and polyvinylidene fluoride (PVdF), polyacrylonitrile (PAN), polyimide, acrylic resin, and polyolefin. Further, these resins may be used in combination with carboxymethyl cellulose (CMC) or a salt thereof, polyethylene oxide (PEO), or the like. These may be used alone or in combination of two or more.

The negative electrode 12 comprises a strip-shaped negative electrode core body and a negative electrode mixture layer. The negative electrode mixture layer includes a negative electrode active material and a binder, and is formed on the negative electrode core body. An example of a suitable negative electrode core body is metal foil containing copper or a copper alloy as a main component. The thickness of the negative electrode core body is, for example, 5 μm to 30 μm.

The negative electrode mixture layer is preferably formed on both side surfaces in the thickness direction of the negative electrode core body. The negative electrode 12 can be produced by applying negative electrode mixture slurry containing a negative electrode active material, a binder, and water to both surfaces of the negative electrode core body and compressing a coating film.

The negative electrode active material is not particularly limited as long as the negative electrode active material can reversibly occlude and release lithium ions. For example, as the negative electrode active material, a carbon material such as natural graphite and artificial graphite, a metal alloying with lithium such as silicon (Si) and tin (Sn), or an oxide containing a metal element such as Si and Sn is used.

Preferable examples of the negative electrode active material can include graphite and silicon oxide represented by $SiO_x$ ($0.5 \leq x \leq 1.6$). The negative electrode mixture layer may include either graphite or silicon oxide represented by $SiO_x$ as the negative electrode active material, or both may be included. When graphite and the silicon oxide are used in combination, the mass ratio of graphite and the silicon oxide is, for example, 99:1 to 80:20, preferably 97:3 to 90:10.

Silicon oxide represented by $SiO_x$ has a structure in which fine particles of Si are dispersed in, for example, an amorphous $SiO_2$ matrix. Silicon oxide represented by $SiO_x$ may contain lithium silicate represented by $Li_{2y}SiO_{(2+y)}$ ($0 < y < 2$), and may have a structure in which fine particles of Si are dispersed in a lithium silicate phase.

A conductive film made of a material having higher conductivity than silicon oxide is preferably formed on the surface of silicon oxide particles represented by $SiO_x$. A material constituting the conductive film is preferably at least one selected from a carbon material, a metal, and a metal compound. Above all, a carbon material is particularly preferably used. The carbon film is formed, for example, at 0.5 to 10% by mass with respect to the mass of $SiO_x$ particles.

As the binder contained in the negative electrode mixture layer, fluororesin, PAN, polyimide, acrylic resin, polyolefin or the like can be used as in the case of the positive electrode. When mixture slurry is prepared using an aqueous solvent, CMC or a salt thereof, styrene-butadiene rubber (SBR), polyacrylic acid (PAA) or a salt thereof or the like is preferably used. These may be used alone or in combination of two or more.

The separator 13 has a strip-shape larger in the winding axis direction (vertical direction of FIG. 2 and FIG. 3) than the strip-shape of the negative electrode 12. A porous sheet having ion permeability and insulating property is used for the separator 13. Specific examples of the porous sheet can include a microporous thin film, woven fabric, and non-woven fabric. As the material of the separator 13, olefin resin such as polyethylene and polypropylene, cellulose, and or like is preferable. The separator 13 may be a laminate having a cellulose fiber layer and a thermoplastic resin fiber layer such as olefin resin.

Now, the auxiliary electrode 40 will be described. A plurality of the batteries 10 are arranged, and a plurality of the batteries 10 are electrically connected in series, in parallel, or in a combination thereof to form a battery module. At this time, a current is collected at upper parts of the plurality of batteries 10. Further, the radial width of the upper end portion 37 of the cylindrical part 30 of the outer package 16 is small, and a curved surface portion of an arcuate cross section is formed, so that an upper end surface of the upper end portion 37 is not flat or the flat portion is often small. Therefore, when another conductive member is joined to the upper end of the cylindrical part 30 by welding, it is difficult to abut the two members having wide areas before joining. Therefore, the shape accuracy of the structure in which other conductive member is connected to the battery is desirably enhanced.

In the embodiment, in order to eliminate such inconvenience, the auxiliary electrode 40 is joined to the outside of a vertical intermediate portion of the cylindrical part 30, and an upward extension part 45 of the auxiliary electrode 40 extends above the upper end portion 37 of the cylindrical part 30, and an external connection part 47 that extends from the upper end of the upward extension part 45 in the direction different from that of the upward extension part 45 is formed. Another conductive member 100 (FIG. 3) is joined to the upper side of the external connection part 47 by welding. Consequently, many portions of the upper end surface of the external connection part 47 can be flattened, and therefore it becomes easy to improve the shape accuracy of the structure in which the other conductive member 100 is connected to the battery 10.

Further, in the embodiment, the position where the auxiliary electrode 40 is joined to the cylindrical part 30 by welding is restricted as described later, so that it is possible to suppress the thermal influence at the time of welding on the portion on the open end 31 side of the gasket 27 and the electrode assembly 14.

Figure 4A:
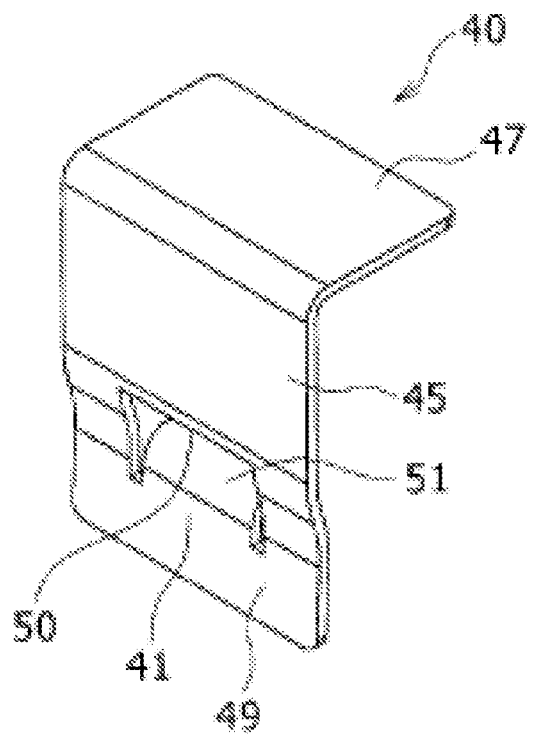
FIG. 4A is a perspective view of an auxiliary electrode of the battery of FIG. 1.
Figure 4B:
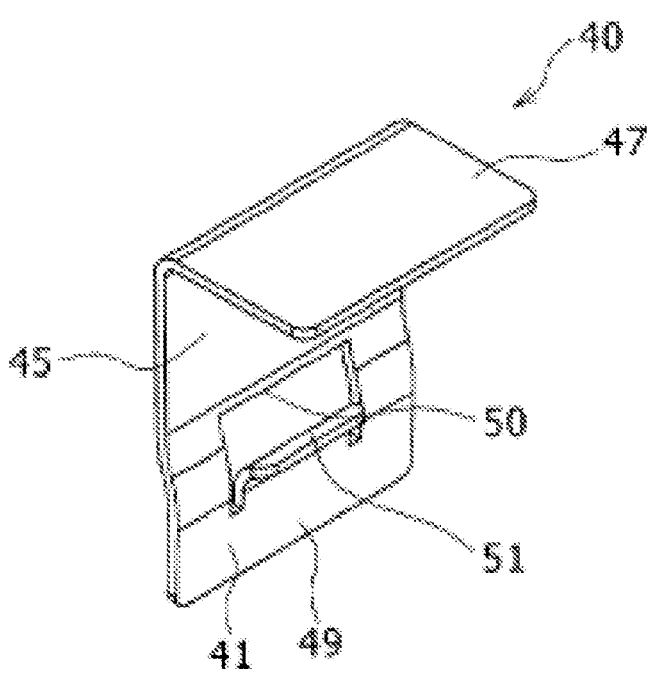
FIG. 4B is a perspective view of the auxiliary electrode of FIG. 4A as viewed from the rear side of FIG. 4A.

FIG. 4A is a perspective view illustrating an auxiliary electrode 40 taken out from FIG. 1. FIG. 4B is a perspective view of the auxiliary electrode 40 as viewed from the rear side of FIG. 4A. The auxiliary electrode 40 is formed by bending a metal plate having high conductivity such as copper, aluminum, iron, steel, and nickel into an approximately L-shaped cross section by press working. The auxiliary electrode 40 has a joint part 41 that is provided in a lower half portion and is welded to the outer circumferential surface of the cylindrical part 30, the plate-shaped upward extension part 45 that is provided in an upper half portion and extends from the upper end of the joint part 41 to the upper side which is the open end 31 side of the cylindrical part 30, and a plate-shaped external connection part 47 that is bent at an approximately right angle to the upward extension part 45 and extends in the direction different from that of the upward extension part 45 from the upper end of the upward extension part 45. The joint part 41 corresponds to the first joint part, and the upward extension part 45 corresponds to the first upward extension part.

The joint part 41 has a downward extension part 49 that is continuous from a lower end, which is an end of the upward extension part 45 on the electrode assembly 14 side, and that extends to a portion beyond a lower end of the groove 33. In a portion of the downward extension part 49 facing the groove 33, a first cutout 50 is formed in an approximately U-shape in which the lower side that is the electrode assembly 14 side is open. In the downward extension part 49, a first bent part 51 bent from the downward extension part 49 toward the cylindrical part 30 is formed inside the first cutout 50. A tip of the first bent part 51 may be cut such that the length of the first bent part 51 is smaller than the vertical length of the first cutout 50.

The joint part 41 is joined to the cylindrical part 30 of the outer package 16 within a range indicated by the arrow a in FIG. 3. Specifically, the joint part 41 is joined to at least one of the groove 33, and a portion of the outer circumferential surface of the cylindrical part 30 located between the groove 33 and the electrode assembly 14 in the winding axis direction (vertical direction of FIG. 2 and FIG. 3) of the electrode assembly 14, by welding. The joint part 41 is preferably joined to at least one of a portion below a valley point G (FIG. 3) of a dent in an outer surface of the groove 33, and a portion of the outer circumferential surface of the cylindrical part 30 located between the groove 33 and the electrode assembly 14 in the winding axis direction of the electrode assembly 14, by welding. Examples of the welding include laser welding, resistance welding, and ultrasonic welding. Specifically, the first bent part 51 of the joint part 41 is joined to the portion below the valley point G of the dent in the outer surface of the groove 33 of the cylindrical part 30.

The external connection part 47 extends so as to face the upper end portion 37 of the outer package 16. The external connection part 47 is electrically connected to the conductive member 100 by joining another conductive member 100 (FIG. 3) to an upper end surface of the external connection part 47 by welding.

Figure 5:
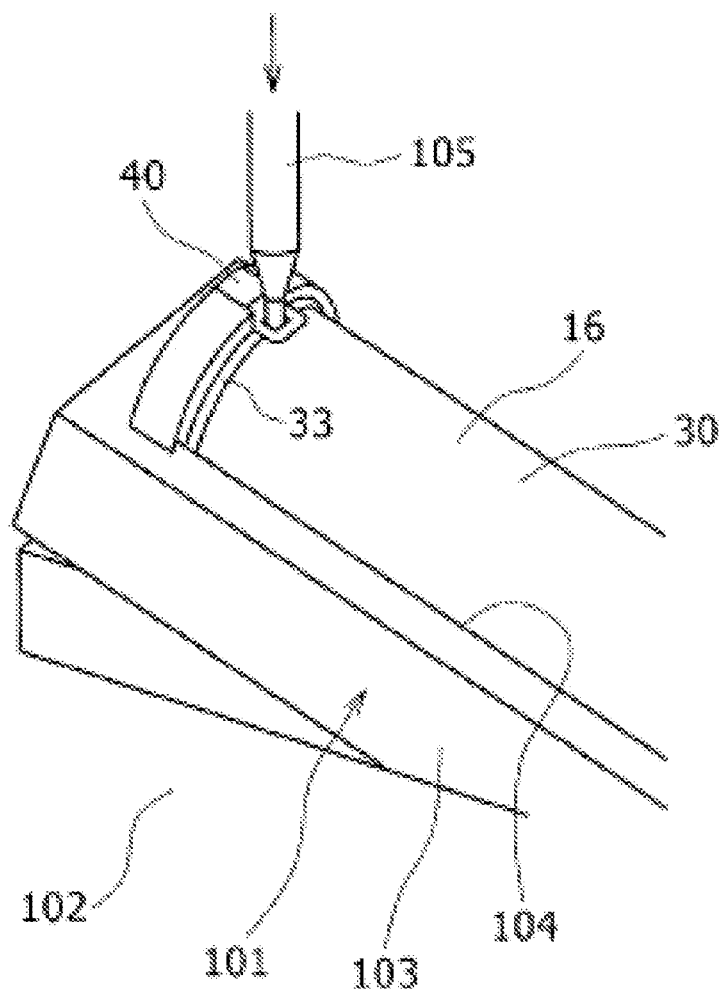
FIG. 5 is a perspective view which illustrates a state in which an outer package of the battery is disposed on a jig, and joins the auxiliary electrode to an outer circumferential surface of the outer package by welding.

FIG. 5 is a perspective view illustrating a state in which the auxiliary electrode 40 is joined to the outer circumferential surface of the outer package 16 by ultrasonic welding. When the auxiliary electrode 40 is joined to the outer package 16, the outer package 16 is held by a holding member 101 (anvil). The holding member 101 has a box part 103 that is formed on the upper side of a main body portion 102 whose upper surface is a horizontal plane so as to be inclined with respect to an upper surface of the main body portion 102 and is formed with a holding hole 104 on the upper side. One half part in the radial direction of the outer package 16 is fitted into the holding hole 104, and the other half part in the radial direction of the outer package 16 protrudes upward from the opening of the box part 103. In this state, the auxiliary electrode 40 is disposed at a predetermined position of the upper end of the outer package 16, and in that state, the first bent part 51 (FIG. 3) of the auxiliary electrode 40 is disposed along a lower open end portion in one part of the circumferential direction of the groove 33 of the outer package 16. Then, an ultrasonic welding horn 105 is pressed from above the first bent part 51 of the auxiliary electrode 40, and welded to the lower open end portion of the groove 33. Before welding, even when the first bent part 51 does not follow the shape of the open end portion of the groove 33, the first bent part 51 is welded in surface contact along the shape of the groove 33 by welding. The joint part of the auxiliary electrode 40 may be joined, by welding, to only one of the groove 33 of the outer package 16 and a portion extending from the lower end of the groove 33 to the bottom in the cylindrical part 30, the portion being located at a position where the electrode assembly does not face inside.

According to the above battery 10, the joint part 41 of the auxiliary electrode 40 is joined to at least one of the groove 33 of the cylindrical part 30, and the portion of the outer circumferential surface of the cylindrical part 30 located between the groove 33 and the electrode assembly 14 in the winding axis direction of the electrode assembly 14. Consequently, it is possible to suppress the thermal influence of the auxiliary electrode 40 at the time of welding on the portion on the open end 31 side of the gasket 27 and the electrode assembly 14.

The joint part 41 of the auxiliary electrode 40 is joined, by welding, to at least one of the portion below the valley point G of the dent in the outer surface of the groove 33, and the portion extending from the lower end of the groove 33 to the bottom 32 in the cylindrical part 30, the portion being located at the position where the electrode assembly 14 does not face inside. Consequently, it is possible to suppress the thermal influence of the auxiliary electrode 40 at the time of welding on the gasket 27 that supports the sealing assembly 17 together with the groove 33, and the electrode assembly 14.

A welded part of the auxiliary electrode 40 to the cylindrical part 30 is formed by the first bent part 51 that is a portion surrounded by the first cutout 50 of the downward extension part 49, and is bent to one side in the thickness direction of the downward extension part 49 which is the groove 33 side of the outer package 16. Consequently, the first bent part 51 easily comes close to or comes in contact with the cylindrical part 30 such that the welded part is along the shape of the cylindrical part 30, for example, the curved surface of the arcuate cross section of the open end portion of the groove 33 or the outer surface of the groove 33, and therefore the area where the welded part and the cylindrical part 30 are in surface contact with each other is increased to facilitate joint strength. Therefore, it is possible to enhance the reliability of the electrical connection between the auxiliary electrode 40 and the cylindrical part 30. In the battery of the present disclosure, the first cutout may not be the U-shaped. For example, in the downward extension part, an approximately L-shape composed of one first straight line extending horizontally from a vertically extending edge of the battery and a second straight line extending downward from a tip of the first straight line may be used. Alternatively, in the battery of the present disclosure, a plurality of first cutouts may be formed with respect to one downward extension part. In the first bent part that is formed from the U-shaped first cutout, the vertically extending portions in the downward extension part are disposed on both sides in the horizontal direction of the first bent part, as compared with the first cutout that extends from the edge of the downward extension part. Therefore, a pair of the portions can further reduce mechanical stress on the welded part.

Second Example of Embodiment

Figure 6:
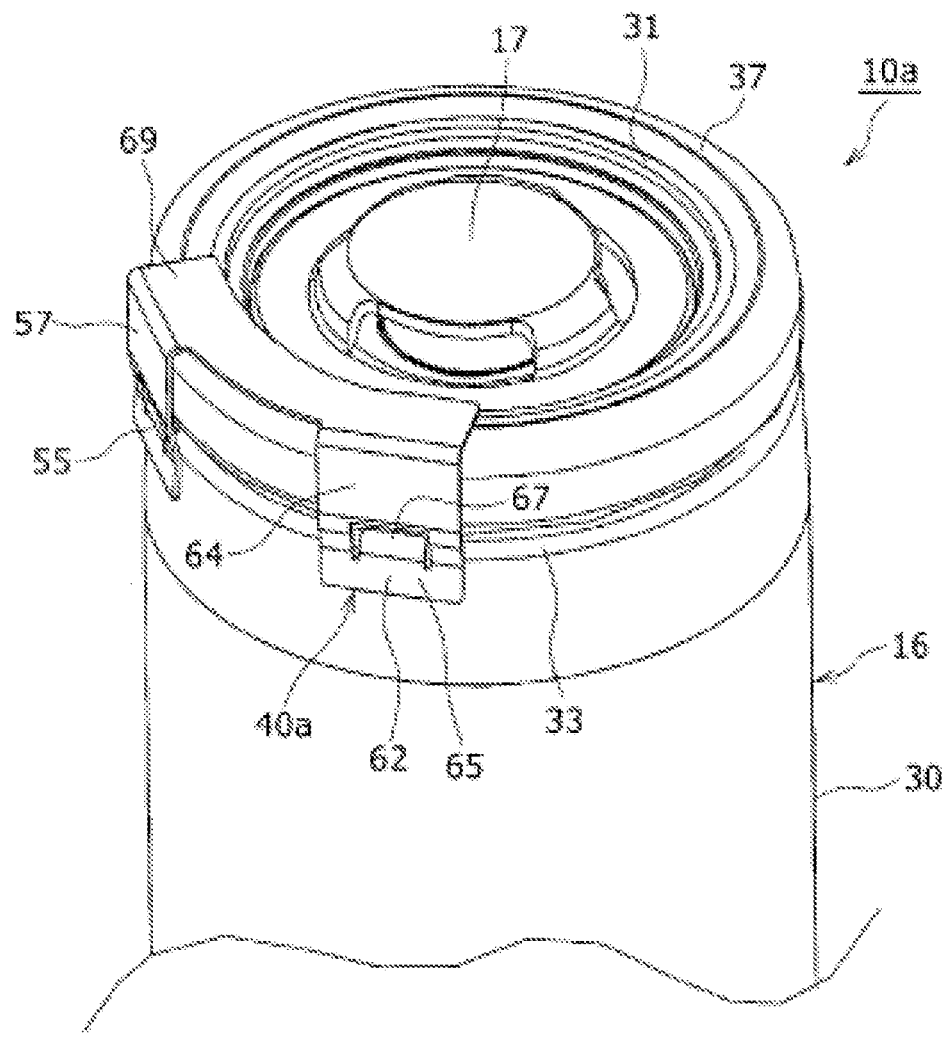
FIG. 6 is a perspective view of an upper side portion of a battery in another example (second example) of the embodiment.
Figure 7A:
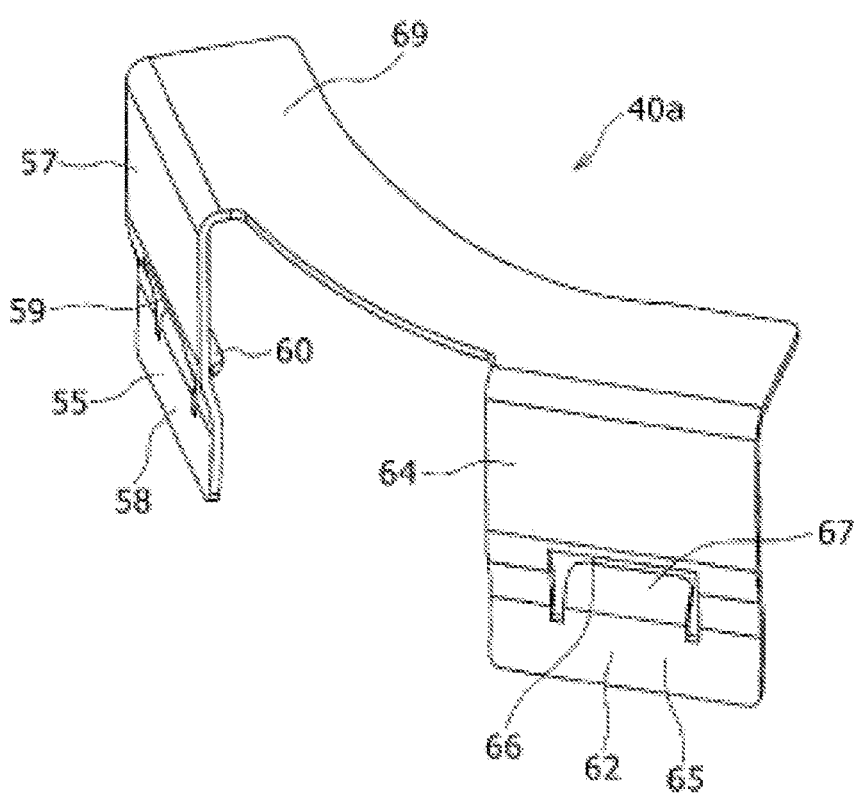
FIG. 7A is a perspective view which illustrates an auxiliary electrode taken out from FIG. 6.

FIG. 6 is a perspective view of an upper side portion of a battery 10a in another example (second example) of the embodiment. FIG. 7A is a perspective view illustrating an auxiliary electrode 40a taken out from FIG. 6. In the case of this example, the two auxiliary electrodes 40 illustrated in FIG. 1 to FIG. 4B are disposed so as to be separated from each other in the circumferential direction of the battery 10a, and the auxiliary electrode 40a having a configuration in which the upper ends thereof are connected is used. Specifically, the auxiliary electrode 40a has a first joint part 55 and a first upward extension part 57 disposed at one end portion in the circumferential direction of an outer package 16 (left end portion in FIG. 7A), a second joint part 62 and a second upward extension part 64 disposed at the other end in the circumferential direction of the outer package 16 (right end portion in FIG. 7A), and an external connection part 69. The first joint part 55 is provided at a lower half portion in one end portion of the auxiliary electrode 40a, and is welded to an outer circumferential surface of a cylindrical part 30. The first upward extension part 57 is provided at an upper half portion in the one end portion of the auxiliary electrode 40a, and is formed in a plate shape extending from the upper end of the first joint part 55 toward the upper side which is the open end 31 side of the cylindrical part 30. The first joint part 55 and the first upward extension part 57 have the same shapes as the joint part 41 and the upward extension part 45 of the auxiliary electrode 40 illustrated in FIG. 1 to FIG. 4B, respectively. Therefore, the first joint part 55 includes a first downward extension part 58, a first cutout 59 formed in the first downward extension part 58, and a first bent part 60 that is formed inside the first cutout 59 in the first downward extension part 58, and is bent from the first downward extension part 58 toward the cylindrical part 30, and the first bent part 60 is joined to a groove 33.

The second joint part 62 is welded away from the first joint part 55 in the circumferential direction of the cylindrical part 30 of the outer package 16. The second joint part 62 is provided at a lower half portion in the other end of the auxiliary electrode 40a, and is welded to the outer circumferential surface of the cylindrical part 30. The second upward extension part 64 is provided at an upper half portion in the other end portion of the auxiliary electrode 40a, and is formed in a plate shape extending from the upper end of the second joint part 62 toward the upper side which is the open end 31 side of the cylindrical part 30. The second joint part 62 and the second upward extension part 64 have the same shapes as the first joint part 55 and the first upward extension part 57, respectively.

Specifically, the second joint part 62 has a second downward extension part 65 that is continuous from a lower end, which is an end of the second upward extension part 64 on the electrode assembly 14 (FIG. 3) side, and that extends to a portion beyond a lower end of the groove 33. In a portion of the second downward extension part 65 facing the groove 33, a second cutout 66 is formed in an approximately U shape in which the lower side that is the electrode assembly side is open. In the second downward extension part 65, a second bent part 67 bent from the second downward extension part 65 toward the cylindrical part 30 is formed inside the second cutout 66. A tip of the second bent part 67 may be cut such that the length of the second bent part 67 is smaller than the vertical length of the second cutout 66.

Similar to the first joint part 55, the second joint part 62 is joined to at least one of the groove 33, and a portion of the outer circumferential surface of the cylindrical part 30 located between the groove 33 and the electrode assembly 14 in the winding axis direction of the electrode assembly 14 (see FIG. 3), by welding. The second joint part 62 is preferably joined to at least one of a portion below a valley point of a dent in an outer surface of the groove 33, and a portion of the outer circumferential surface of the cylindrical part 30 located between the groove 33 and the electrode assembly 14 in the winding axis direction of the electrode assembly 14, by welding. Specifically, the second bent part 67 of the second joint part 62 is joined to the portion below the valley point of the dent in the outer surface of the groove 33. The first joint part 55 and the second joint part 62 may be each joined, by welding, to only one of the groove 33, and the portion of the outer circumferential surface of the cylindrical part 30 located between the groove 33 and the electrode assembly 14.

The external connection part 69 is formed in an arcuate plate-shape connected to the upper ends of the first upward extension part 57 and the second upward extension part 64 by being bent at an approximately right angle to each of the upward extension parts 57, 64, and extends in the direction different from each of the upward extension parts 57, 64, specifically, extends so as to face the upper end portion 37 of the outer package 16. Consequently, the first upward extension part 57 and the second upward extension part 64 are connected at two positions separated in the circumferential direction of the external connection part 69.

Figure 7B:
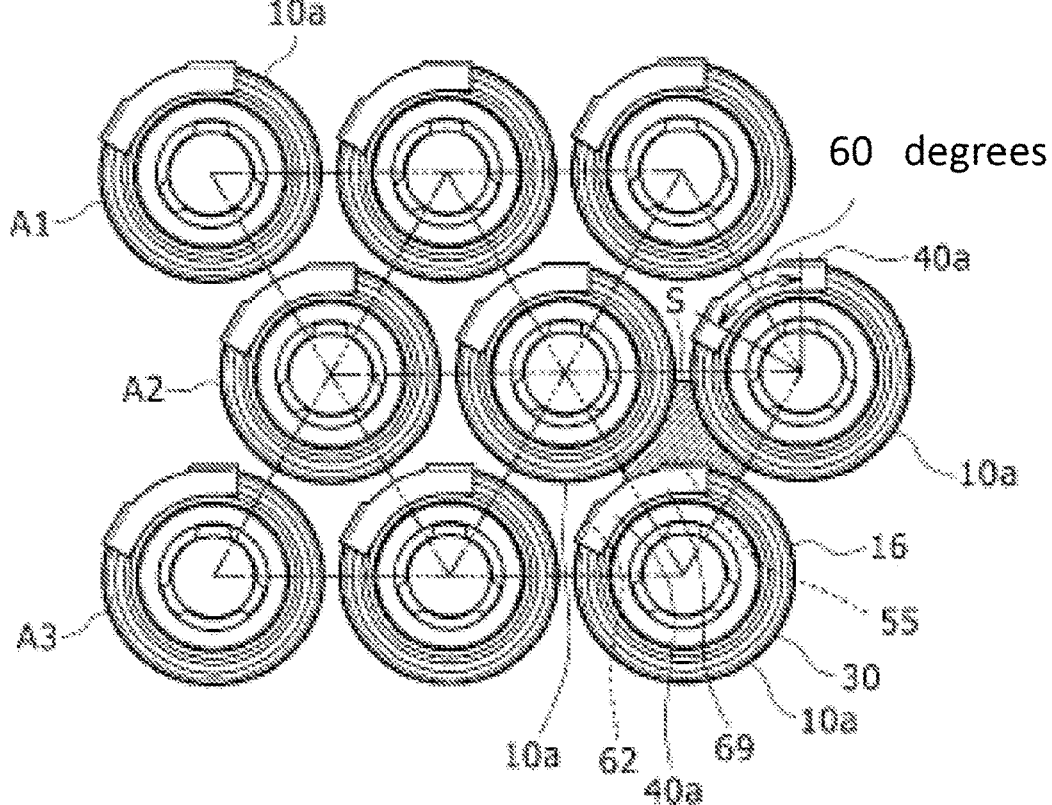
FIG. 7B is a diagram of an arrangement configuration in which a plurality of batteries of FIG. 7A are arranged, as viewed from above.

FIG. 7B is a diagram of an arrangement configuration in which a plurality of the batteries 10a of FIG. 7A are arranged, as viewed from above. The battery module is formed by electrically connecting a plurality of the batteries 10a in series, in parallel, or a combination thereof in a state in which a plurality of the batteries 10a are arranged as illustrated in FIG. 7B. At this time, the plurality of batteries 10a are arranged in three columns of a first column A1, a second column A2, and a third column A3 in this order in the predetermined first direction (vertical direction in FIG. 7B), and the plurality of batteries 10a in each column are arranged side by side in the second direction (left-right direction in FIG. 7B) orthogonal to the first direction. Each battery of the second column A2 is disposed in the center between adjacent two battery centers in the first column A1 and the third column A3 in the second direction. Consequently, the plurality of batteries 10a can be arranged in a zigzag, and the density of the plurality of batteries 10a in a space can be increased. Further, as illustrated in FIG. 7B, the shape, in which the centers of the batteries 10a are connected by a straight line in a state where the plurality of batteries 10a are viewed from above, is tessellated by arranging a plurality of columns in which equilateral triangles are alternately turned upside down. In this case, in each auxiliary electrode 40a, the centers of the first joint part 55 and the second joint part 62 in the circumferential direction are arranged at a central angle of 60 degrees as viewed from the center of the battery. Consequently, a joint part arranged in a central space of the three batteries adjacent to each other in a triangular arrangement as illustrated in FIG. 7B (for example, the shaded area S in FIG. 7B) is easily made to be only one joint part 55 (or 62) of one auxiliary electrode 40a. Therefore, in the battery module, it is easy to secure an insulation distance by reducing the portion to be projected in the radial direction from the outer circumferential surface of the cylindrical part 30 of the outer package 16 in each central space without increasing intervals between the plurality of batteries 10a.

According to the configuration of this example, the auxiliary electrode 40a has the first joint part 55 and the second joint part 62 that are welded at the positions separated from each other in the circumferential direction of the cylindrical part 30 of the outer package 16, and the first upward extension part 57 extending upward from the first joint part 55, and the second upward extension part 64 extending upward from the second joint part 62 are connected to the external connection part 69. Consequently, the auxiliary electrode 40a has two joint positions with respect to the outer package 16, and therefore it is possible to increase the joint strength between the auxiliary electrode 40a and the outer package 16.

Furthermore, the respective welded parts of the auxiliary electrode 40a to the cylindrical part 30 are formed by the first bent part 60 and the second bent part 67. Consequently, each welded part of the auxiliary electrode 40a to the cylindrical part 30 is bent along the shape of the cylindrical part 30, and therefore the area where the welded parts and the cylindrical part 30 are in surface contact with each other can be increased, and the bonding strength can be further increased. In this example, other configurations and actions are similar to a case of the configurations of FIG. 1 to FIG. 5.

Third Example of Embodiment

Figure 8:
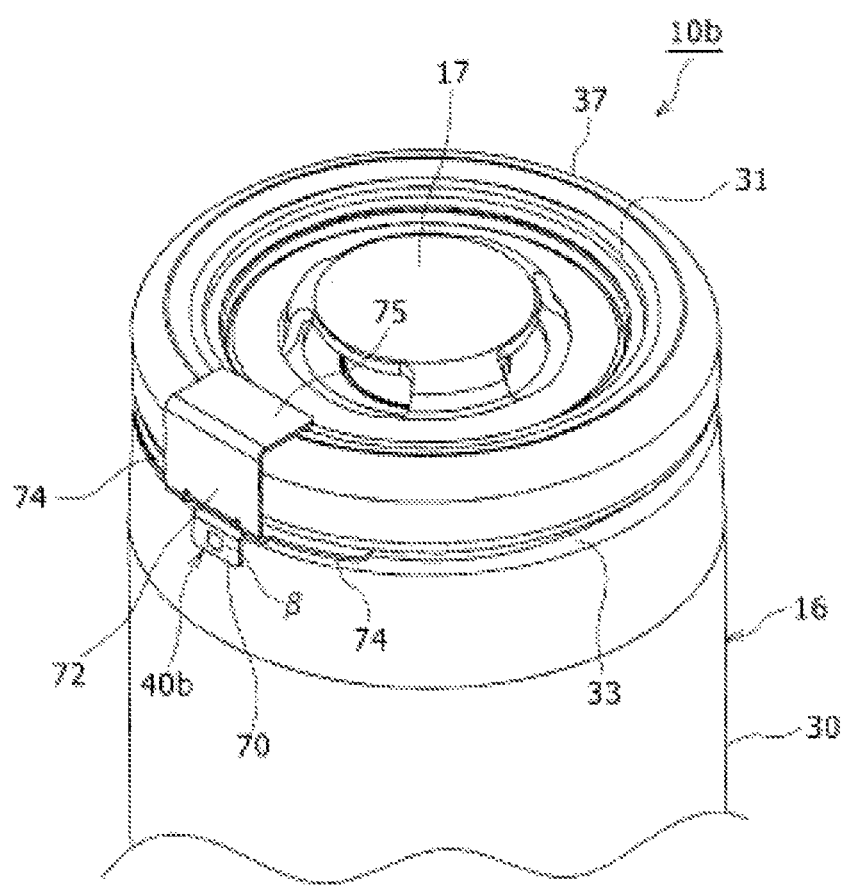
FIG. 8 is a perspective view of an upper side portion of a battery in another example (third example) of the embodiment.

FIG. 8 is a perspective view of an extracted upper side portion of a battery 10b in another example (third example) of the embodiment. First, a problem to be solved by this example will be described. Specifically, in BACKGROUND ART, when an auxiliary electrode cannot be held on an outer package before being joined to the outer package by welding, the workability of the welding work deteriorates. Further, even after welding, when the auxiliary electrode tries to be displaced with respect to the outer package due to external force, mechanical stress is applied to a joint part between the auxiliary electrode and the outer package, and the reliability of the joint part may decrease. It is an advantage of this example to enhance the joining reliability between the outer package and the auxiliary electrode in the battery. In the case of this example, an auxiliary electrode 40b includes two support parts 74 extending in the circumferential direction of the battery 10b, and each support part 74 is inserted into a groove 33 of an outer package 16. Consequently, the auxiliary electrode 40b becomes easily held on the outer package 16 before welding the auxiliary electrode 40b to the outer package 16. Further, even after welding, the binding reliability of the auxiliary electrode 40b to the outer package 16 can be enhanced. Consequently, the auxiliary electrode 40b comprises the support parts 74 inserted into the groove 33, so that it is possible to improve the workability of the welding work, and it is possible to enhance the reliability of the welding portion after welding of the auxiliary electrode 40b to the outer package 16.

Figure 9:
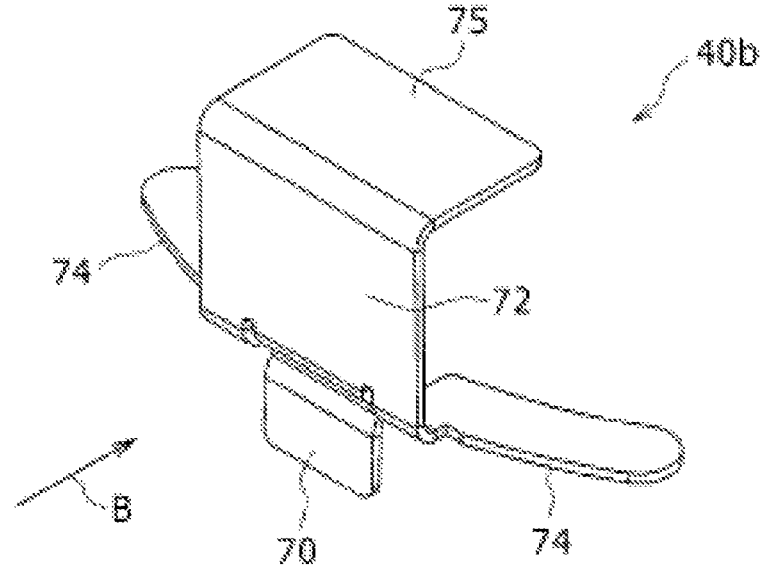
FIG. 9 is a perspective view which illustrates an auxiliary electrode taken out from FIG. 8.
Figure 10:
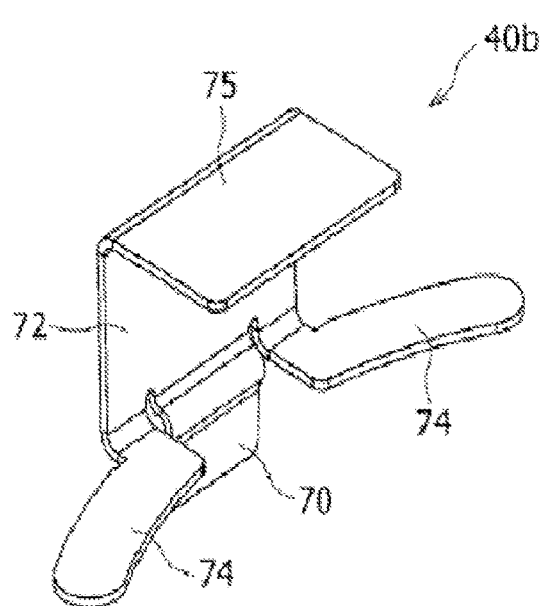
FIG. 10 is a perspective view of the auxiliary electrode of FIG. 9 as viewed from the rear side of FIG. 9.
Figure 11:
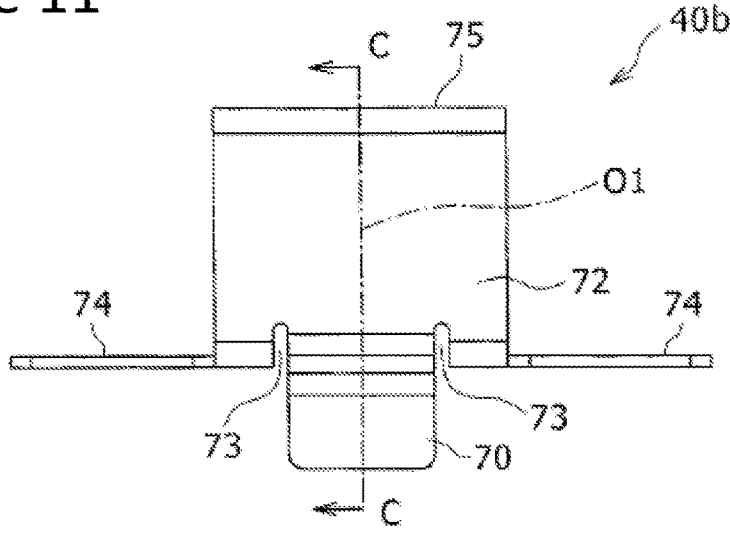
FIG. 11 is a diagram viewed along the B arrow of FIG. 9.
Figure 12:
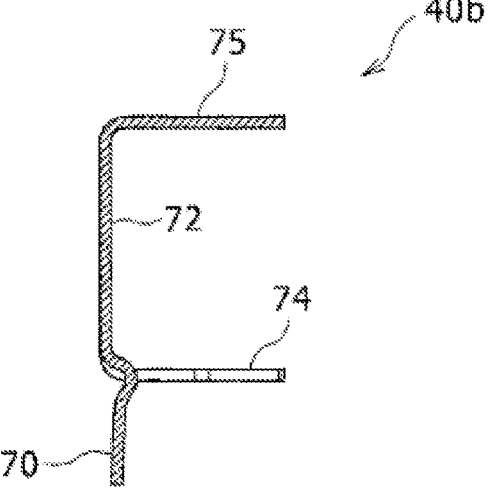
FIG. 12 is a cross-sectional view taken along the line C-C of FIG. 11.
Figure 13:
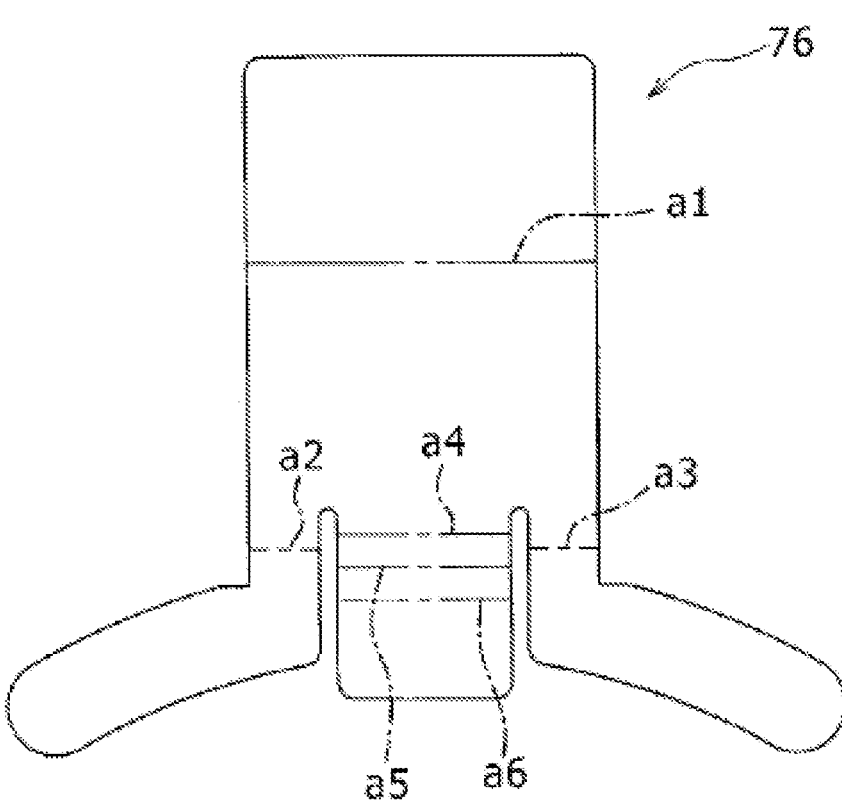
FIG. 13 is a development of the auxiliary electrode of FIG. 9.

The auxiliary electrode 40b will be described in detail with reference to FIG. 9 to FIG. 13. FIG. 9 is a perspective view of the auxiliary electrode 40b in the battery 10b. FIG. 10 is a perspective view of the auxiliary electrode 40b of FIG. 9 as viewed from the rear side. FIG. 11 is a diagram viewed along the B arrow of FIG. 9. FIG. 12 is a cross-sectional view taken along the line C-C of FIG. 11. FIG. 13 is a development of the auxiliary electrode 40b.

The auxiliary electrode 40b has a joint part 70 that is provided in a lower end portion and is welded to the outer circumferential surface of the cylindrical part 30, a plate-shaped upward extension part 72 that is connected to the upper side of the joint part 70 and extends from an upper end of the joint part 70 to the upper side which is the open end side of the cylindrical part 30, and a plate-shaped external connection part 75 that is bent at an approximately right angle to the upward extension part 72 and extends in the direction different from that of the upward extension part 72 from an upper end of the upward extension part 72. The joint part 70 corresponds to the first joint part, and the upward extension part 72 corresponds to the first upward extension part. The external connection part 75 is similar to the case of the auxiliary electrode 40.

The two support parts 74 extending in the circumferential direction of the cylindrical part 30 are connected to lower ends, which are ends on the electrode assembly 14 (FIG. 3) side, of both end portions in the circumferential direction of the upward extension part 72. The two support parts 74 have arcuate plate shapes extending outward in the opposite directions of the circumferential direction, and the two support parts 74 are disposed on the same plane. In the battery of the present disclosure, the support parts do not have to be connected to the lower end of the upward extension portion. For example, the support parts may extend from both ends in the horizontal direction of the upward extension part.

Further, in the battery of present disclosure, the support part is not limited to the arcuate plate shape as long as the support part is inserted into the groove of the cylindrical part. For example, the support part may have an approximately rectangular plate shape.

The joint part 70 is continuous from a lower end of a circumferential intermediate portion of the upward extension part 72, and extends below a lower end of the groove 33. A portion of the joint part 70 facing the groove 33 is curved in a chevron shape having an arcuate cross section so as to be able to be inserted into an opening of the groove 33.

The joint part 70 is joined to the cylindrical part 30 of the outer package 16 at a portion illustrated by the rectangle β in FIG. 8. Specifically, the joint part 70 is joined to a portion of the outer circumferential surface of the cylindrical part 30 located between the groove 33 and the electrode assembly 14 in the winding axis direction of the electrode assembly 14 (FIG. 3), by welding.

Figure 14:
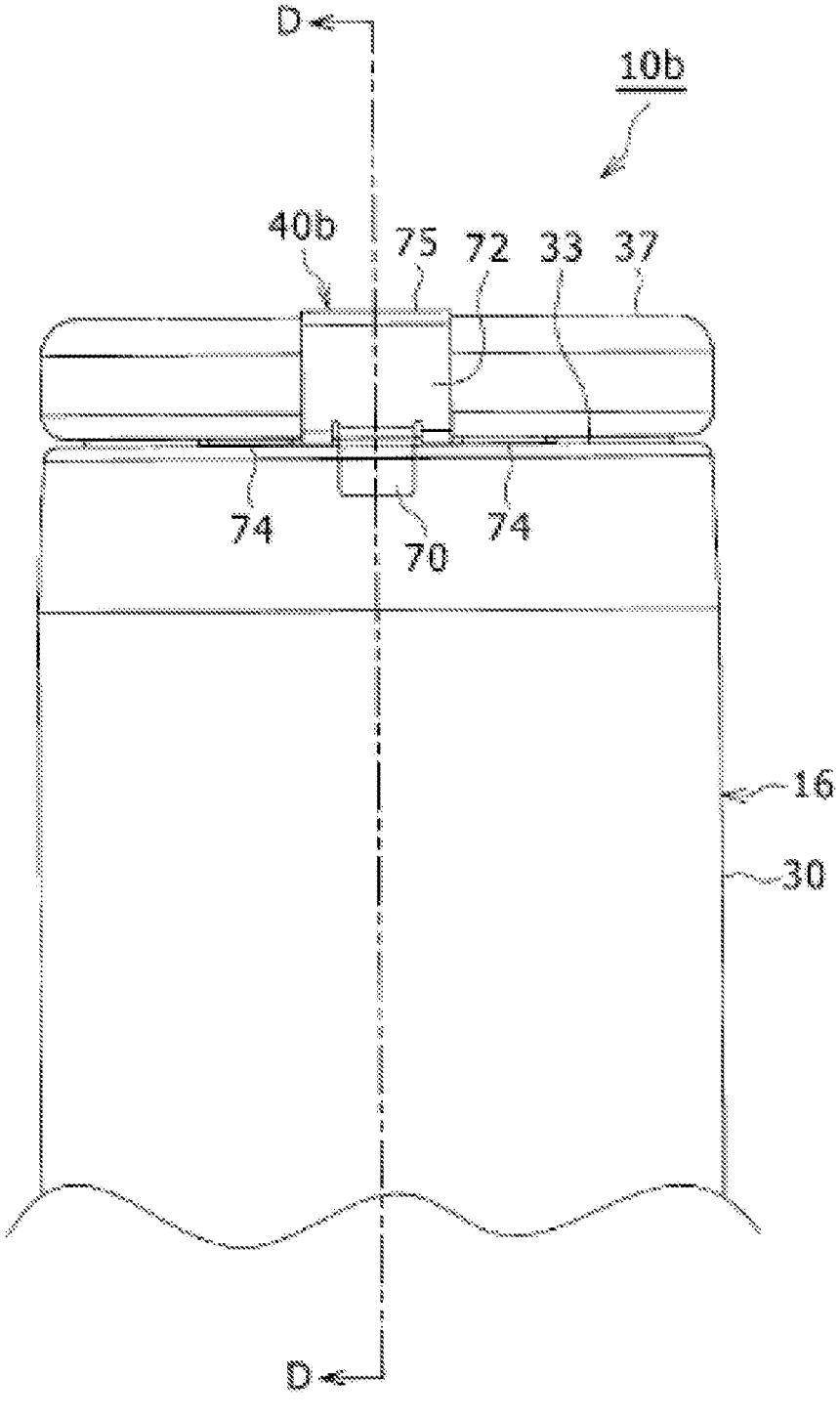
FIG. 14 is a front view of the battery of FIG. 8.
Figure 15:
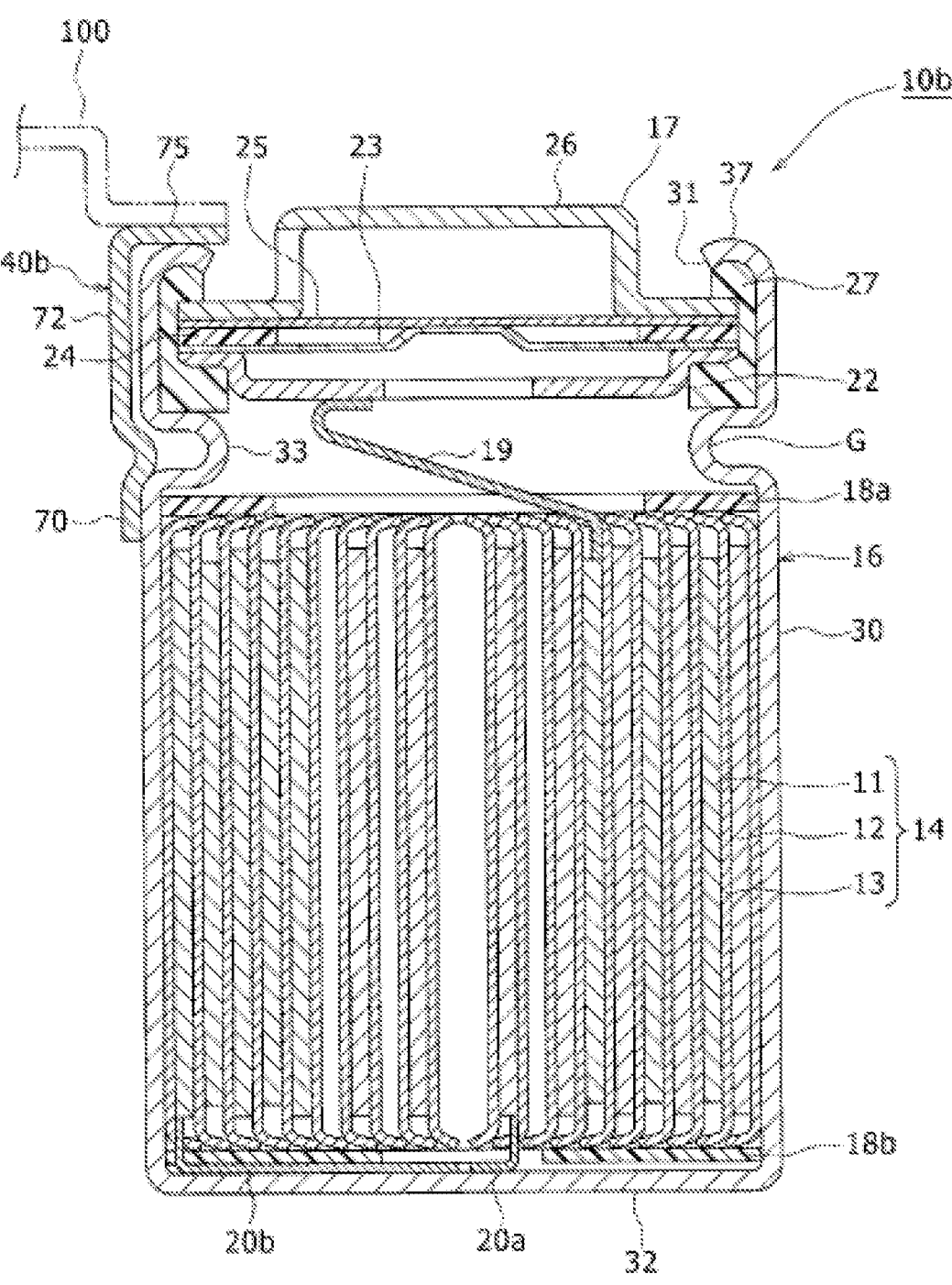
FIG. 15 is a cross-sectional equivalent view taken along the line D-D of FIG. 14 illustrating the exaggerated thickness of constituent members of the battery.

FIG. 14 is a front view of the battery 10b of FIG. 8. FIG. 15 is a cross-sectional equivalent view taken along the line D-D of FIG. 14 illustrating the exaggerated thickness of constituent members of the battery 10b. The joint part 70 may be joined to the groove 33 by welding. The joint part 70 may be joined, by welding, to at least one of a portion below a valley point G (FIG. 15) of a dent in the outer surface of the groove 33, and a portion extending from the lower end of the groove 33 to a bottom 32 in the cylindrical part 30, the portion being located at a position where the electrode assembly 14 does not face inside. Examples of the welding include laser welding, resistance welding, and ultrasonic welding. For example, the joint part 70 may be joined, by welding, to the outer package 16 below the valley point G of the dent in the outer surface of the groove 33 together with the portion indicated by the rectangle β in FIG. 8 or instead of the portion indicated by the rectangle β.

The external connection part 75 extends so as to face an upper end portion 37 of the outer package 16. Another conductive member 100 (FIG. 15) is joined to an upper end surface of the external connection part 75 by welding, so that the external connection part 75 is electrically connected to the conductive member 100.

In the auxiliary electrode 40b, a cutout 73 (FIG. 11) parallel to the central axis O1 (FIG. 11) is formed between a root portion of each support part 74 and a root portion of the joint part 70. In this state, the two support parts 74 are disposed on both sides in the circumferential direction of the joint part 70.

As illustrated in FIG. 13, a flat plate-shaped metal plate is punched into the shape of the auxiliary electrode 40b before bending to form an intermediate material 76, and the intermediate material 76 is bent by a plurality of bent lines (dot-dash lines a1 to a6 in FIG. 13), so that the auxiliary electrode 40b is formed. The dot-dash lines a1 to a4, and a6 are the positions that are tops when bending formation is performed such that the front side of the paper surface of FIG. 13 is the outer surface of the bent part, and the dot-dash line a5 is a position that is a valley when bending formation is performed such that the rear side of the paper surface of FIG. 13 is the outer surface of the bent part.

As illustrated in FIG. 8, the auxiliary electrode 40b is held by the outer package 16 in a state in which the support parts 74 are inserted in the groove 33, and in that state, the joint part 70 of the auxiliary electrode 40b is joined to the outer package 16 by welding. Consequently, the auxiliary electrode 40b can be easily held on the outer package 16 before the auxiliary electrode 40b is welded to the outer package 16, and therefore the displacement of the auxiliary electrode 40b can be suppressed and the workability of the welding work can be improved. Further, even when force is applied to the upward extension part 72 of the auxiliary electrode 40b in the vertical direction or in the direction of causing rotation about the predetermined direction in the state after welding, the support part 74 engages with the lower end of the groove 33, so that it is possible to suppress the displacement of the auxiliary electrode 40b with respect to the outer package 16. Therefore, it is possible to suppress the application of the force in the above direction to the welded part.

The battery of such an example comprises an electrode assembly obtained by winding a first electrode and a second electrode with a separator therebetween; an outer package that has a cylindrical part having a cylindrical shape, an open end formed at one end of the cylindrical part, and a bottom closing the other end of the cylindrical part, and that stores the electrode assembly therein, and that is electrically connected to the first electrode; a sealing assembly that closes the open end of the outer package together with a gasket, and is electrically connected to the second electrode; and an auxiliary electrode having a first joint part that is welded to an outer circumferential surface of the cylindrical part, a plate-shaped first upward extension part that extends from the first joint part toward the open end, and a plate-shaped external connection part that extends from the first upward extension part in a direction different from a direction of the first upward extension part, and is connected to another conductive member, and comprises a configuration in which the cylindrical part has a groove having the outer circumferential surface dented so as to protrude an inner circumferential surface of the cylindrical part, and the auxiliary electrode has at least one support part that extends in a circumferential direction of the cylindrical part, and is inserted into the groove. According to the above configuration, it is possible to suppress the displacement of the auxiliary electrode with respect to the outer package. Consequently, it is possible to enhance the reliability of the joint part between the auxiliary electrode and the outer package.

More specifically, according to the above battery 10*b*, in a configuration in which the auxiliary electrode 40*b* is welded to the outer circumferential surface of the cylindrical part 30 of the outer package 16, and before the auxiliary electrode 40*b* is welded, in the state in which the support parts 74 are inserted into the groove 33, the auxiliary electrode 40*b* is held on the outer package 16. Consequently, the workability of the welding work of the auxiliary electrode 40*b* can be improved. Further, even when force is applied to the upward extension part 72 of the auxiliary electrode 40*b* in the vertical direction or the direction in which the auxiliary electrode 40*b* rotates in the state after welding of the auxiliary electrode 40*b*, the support parts 74 engage with the groove 33, so that it is possible to suppress the displacement of the auxiliary electrode 40*b* with respect to the outer package 16. Consequently, it is possible to improve the joining reliability of the auxiliary electrode 40*b* after welding with respect to the outer package 16.

The joint part 70 of the auxiliary electrode 40*b* is joined to at least one of the groove 33 of the cylindrical part 30, and the portion of the outer circumferential surface of the cylindrical part 30 located between the groove 33 and the electrode assembly 14. Consequently, it is possible to suppress the thermal influence at the time of welding of the auxiliary electrode 40*b* on the portion on the open end 31 side of the gasket 27 and the electrode assembly 14.

The joint part 70 of the auxiliary electrode 40*b* is joined, by welding, to at least one of the portion below the valley point G of the dent in the outer surface of the groove 33, and the portion of the outer circumferential surface of the cylindrical part 30 located between the groove 33 and the electrode assembly 14. Consequently, it is possible to suppress the thermal influence at the time of welding of the auxiliary electrode 40*b* on the gasket 27 that supports the sealing assembly 17 together with the groove 33, and the electrode assembly 14.

Fourth Example of Embodiment

Figure 16:
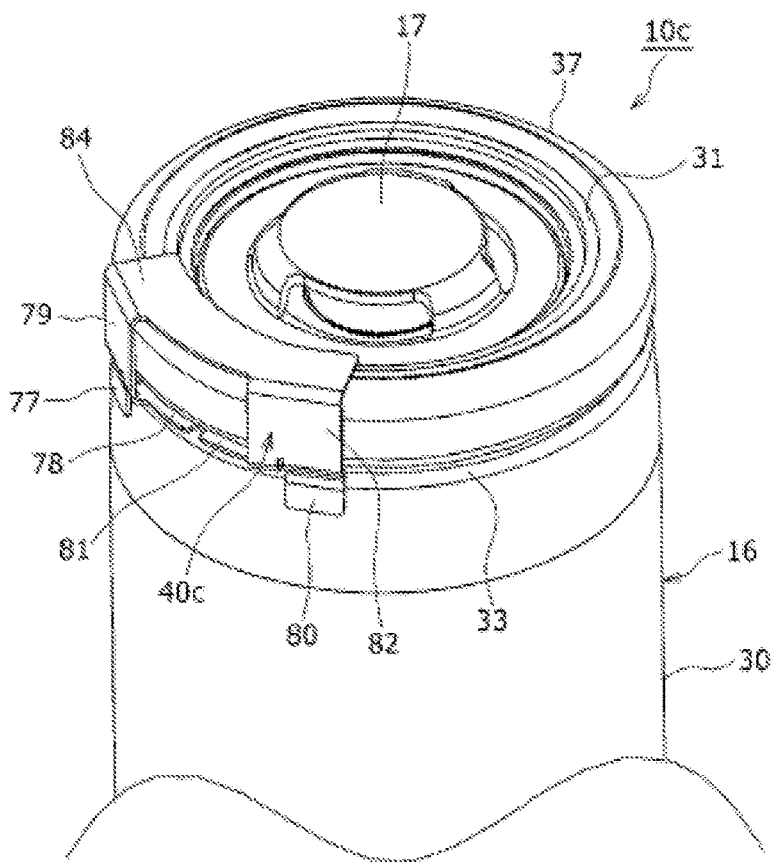
FIG. 16 is a perspective view of an upper side portion of a battery in another example (fourth example) of the embodiment.
Figure 17:
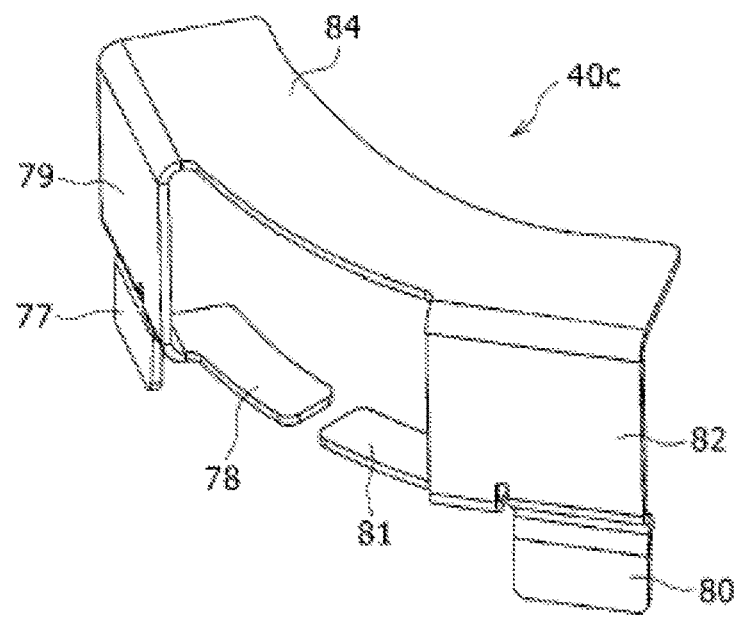
FIG. 17 is a perspective view illustrating an auxiliary electrode taken out from FIG. 16.
Figure 18:
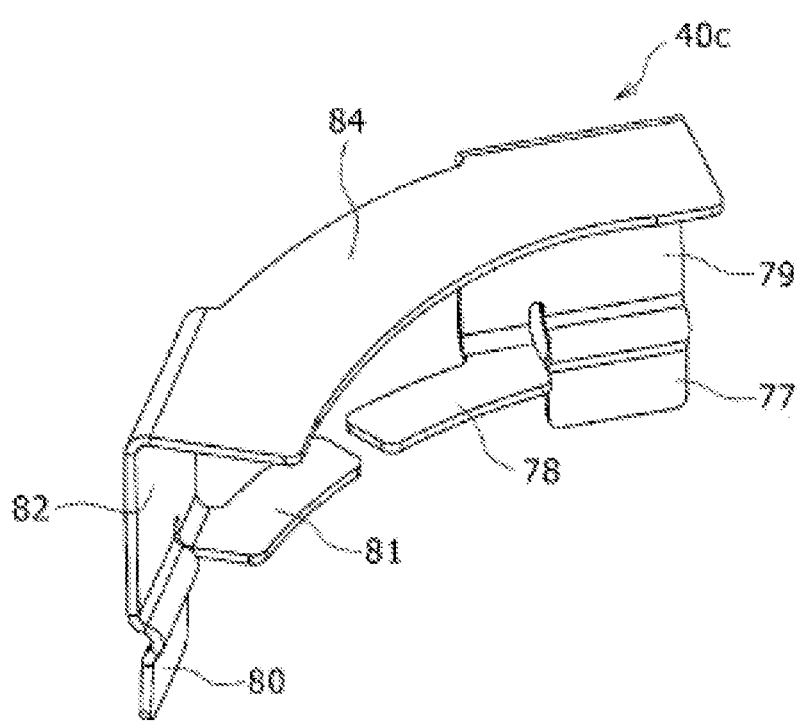
FIG. 18 is a perspective view of the auxiliary electrode of FIG. 17 as viewed from the rear side of FIG. 17.
Figure 19:
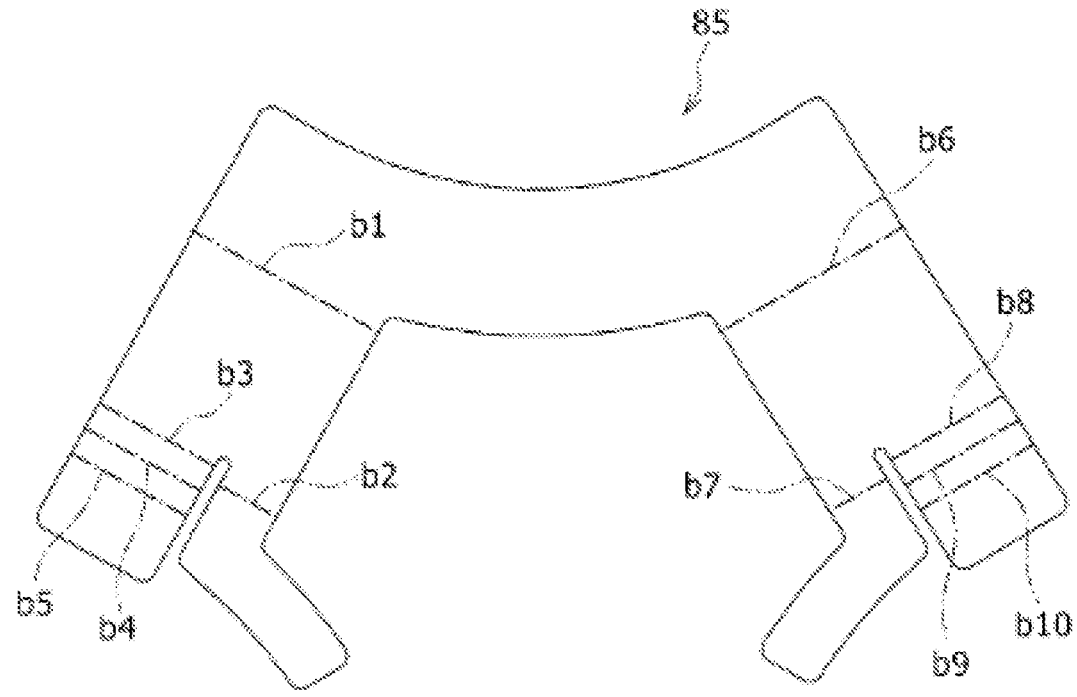
FIG. 19 is a development of the auxiliary electrode of FIG. 17.

FIG. 16 is a perspective view illustrating an extracted upper side portion of a battery 10*c* in another example (fourth example) of the embodiment. FIG. 17 is a perspective view of an auxiliary electrode 40*c* in the battery 10*c*. FIG. 18 is a perspective view of the auxiliary electrode 40*c* of FIG. 17 as viewed from the rear side of the auxiliary electrode 40*c* of FIG. 17. FIG. 19 is a development of the auxiliary electrode 40*c*.

In the configuration of this example, the auxiliary electrode 40*c* having a configuration in which two partial auxiliary electrodes 40*b* illustrated in FIG. 8 to FIG. 15 are disposed so as to be separated from each other in the circumferential direction of the battery 10*c*, and upper ends thereof are connected to each other is used. Specifically, the auxiliary electrode 40*c* has a first joint part 77 and a first upward extension part 79 disposed at one end portion (left end portion in FIG. 16) in the circumferential direction of an outer package 16, a second joint part 80 and a second upward extension part 82 disposed at the other end portion (right end portion in FIG. 16) in the circumferential direction of the outer package 16, and an external connection part 84. The first joint part 77 is provided at a lower end portion in the one end portion of the auxiliary electrode 40*c*, and is welded to an outer circumferential surface of a cylindrical part 30. The first joint part 77 extends below a lower end of the groove 33 from a lower end of the first upward extension part 79. The first upward extension part 79 is connected to the upper side of the first joint part 77 in the one end portion of the auxiliary electrode 40*c*, and is formed in a plate shape extending upward from an upper end of the first joint part 77. A first support part 78 which is similar to one of the support parts 74 (right side in FIG. 10 and FIG. 11, left side in FIG. 12) in the circumferential direction of the auxiliary electrode 40*b* is connected to one end portion in the circumferential direction of the lower end portion of the first upward extension part 79 (left end portion in FIG. 16 and FIG. 17, right end portion in FIG. 18).

The second joint part 80 is welded away from the first joint part 77 in the circumferential direction of the cylindrical part 30 of the outer package 16. The second joint part 80 is provided at a lower end portion in the other end of the auxiliary electrode 40*c*, and is welded to the outer circumferential surface of the cylindrical part 30. The second joint part 80 extends below the lower end of the groove 33 from a lower end of the second upward extension part 82. The second upward extension part 82 is connected to the upper side of the second joint part 80 in the other end portion of the auxiliary electrode 40*c*, and is formed in a plate shape extending upward from an upper end of the second joint part 80. A second support part 81 which is similar to the other one of the support parts 74 (left side in FIG. 10 and FIG. 11, right side in FIG. 12) in the circumferential direction of the auxiliary electrode 40*b* is connected to the other end portion in the circumferential direction of the lower end portion of the second upward extension part 82 (right end portion in FIG. 16 and FIG. 17, left end portion in FIG. 18).

The external connection part 84 is formed in an arcuate plate-shape connected to the upper ends of the first upward extension part 79 and the second upward extension part 82 by being bent at an approximately right angle to each of the upward extension parts 79, 82 on the same sides as the support parts 78, 81, and extends in the direction different from each of the upward extension parts 79, 82. Consequently, the first upward extension part 79 and the second upward extension part 82 are connected at two positions separated in the circumferential direction of the external connection part 84.

The first support part 78 connected to the first upward extension part 79 and the second support part 81 connected to the upward extension part 82 are arcuate plate shapes disposed so as to approach each other. The two support parts 78, 81 are disposed on one plane.

As illustrated in FIG. 19, a flat plate-shaped metal plate is punched into the shape of the auxiliary electrode 40*c* before bending to form an intermediate material 85, and the intermediate material 85 is bent by a plurality of bent lines (dot-dash lines b1 to b10 in FIG. 19), so that the auxiliary electrode 40*c* is formed. The dot-dash lines b1 to b3, b5 to b8, b10 are the positions that are tops when bending formation is performed such that the front side of the paper surface of FIG. 19 is the outer surface of the bent part, and the dot-dash lines b4, b9 are positions that are valleys when bending formation is performed such that the rear side of the paper surface of FIG. 19 is the outer surface of the bent part.

As illustrated in FIG. 16, the auxiliary electrode 40*c* is held on the outer package 16 in a state in which the support parts 78, 81 are inserted in the groove 33, and in that state, the joint parts 77, 80 of the auxiliary electrode 40*c* are joined to the outer package 16 by welding. In this state, the support parts 78, 81 are each along one part shape in the circumferential direction of the groove 33.

In the case of this example as well, similarly to the battery arrangement of the battery module illustrated in FIG. 7B, in the auxiliary electrode 40*c*, the centers of the first joint part 77 and the second joint part 80 in the circumferential direction may be disposed away at a central angle of 60 degrees as viewed from the center of the battery.

According to the configuration of this example, similar to the auxiliary electrode 40a, the auxiliary electrode 40c has two joint positions with respect to the outer package 16 and therefore the joint strength between the auxiliary electrode 40c and the outer package 16 can be increased. In this example, other configurations and actions are similar to those of the auxiliary electrodes 40, 40a, 40b.

In the auxiliary electrodes 40, 40a, 40b, 40c, the auxiliary electrodes 40b, 40c may be provided with only one support part to be inserted into the groove 33.

Fifth Example of Embodiment

Figure 20:
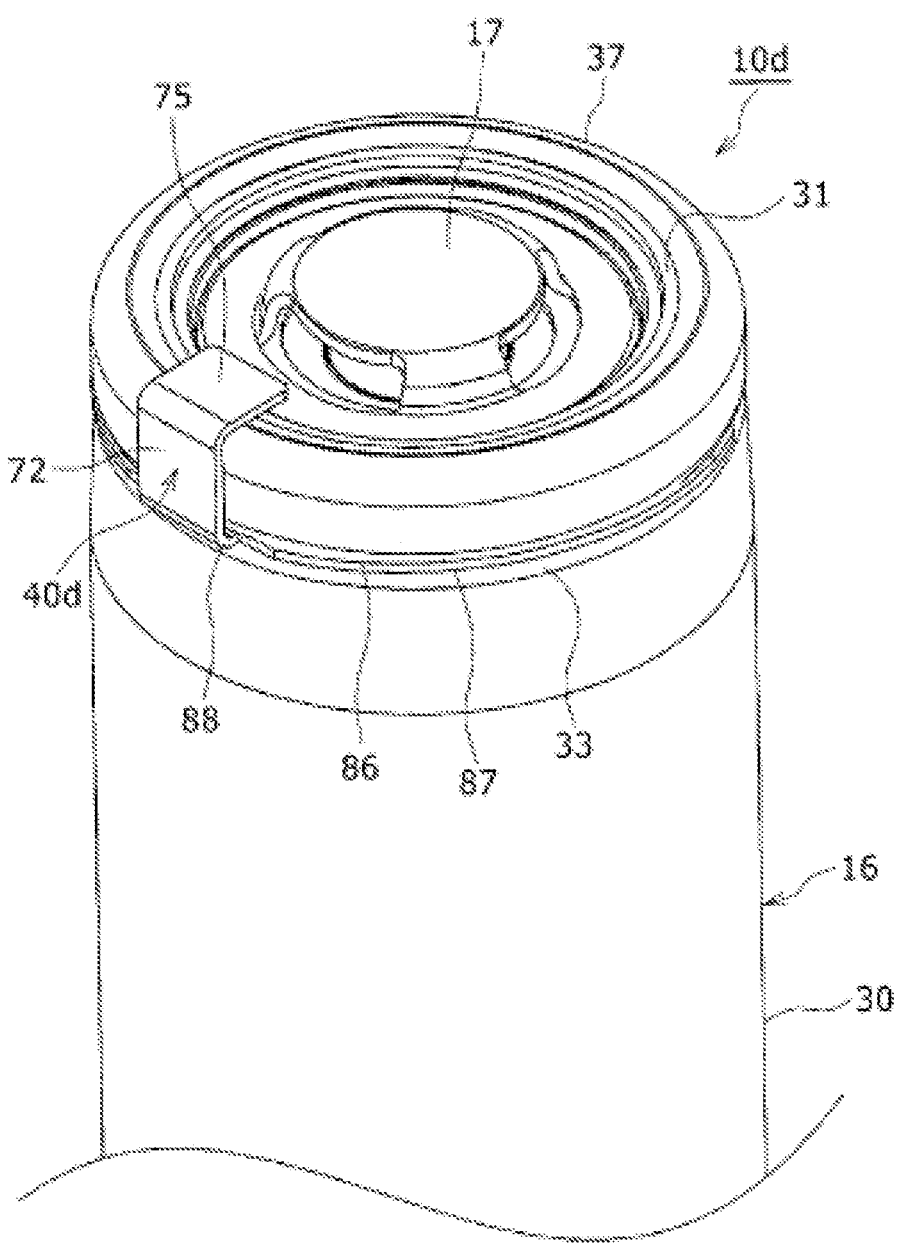
FIG. 20 is a perspective view of an upper side portion of a battery in another example (fifth example) of the embodiment.
Figure 21:
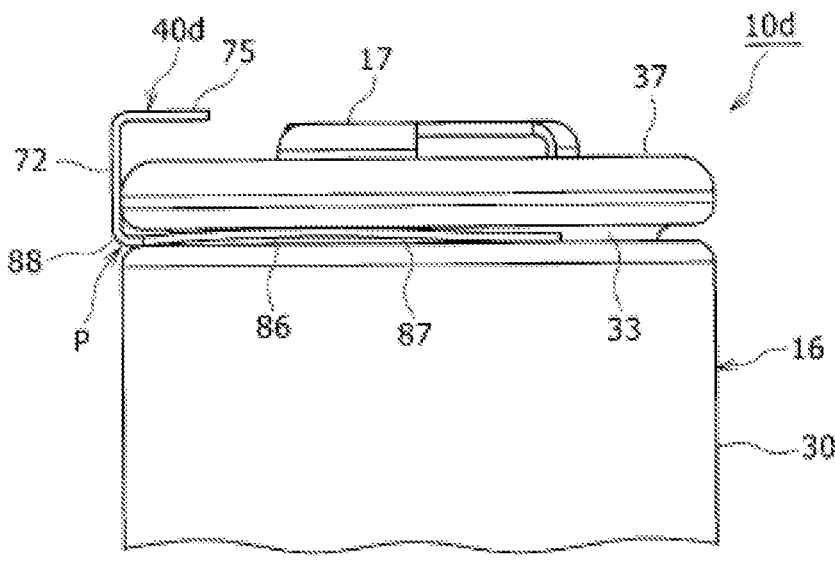
FIG. 21 is a side view of the battery of FIG. 20.
Figure 22:
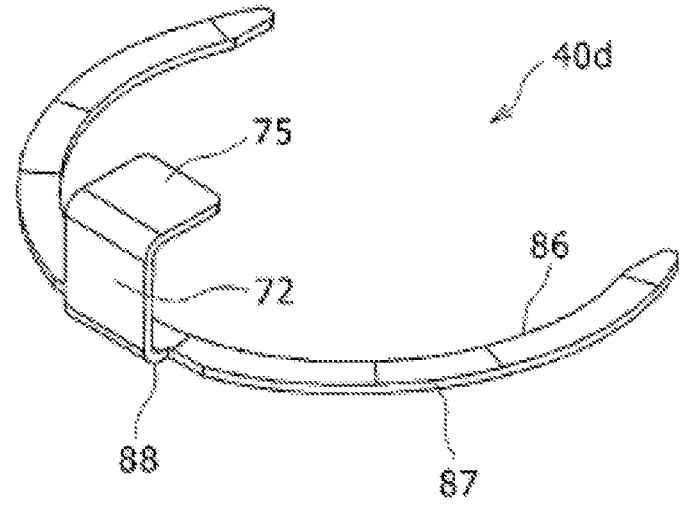
FIG. 22 is a perspective view illustrating an auxiliary electrode taken out from FIG. 21.
Figure 23:
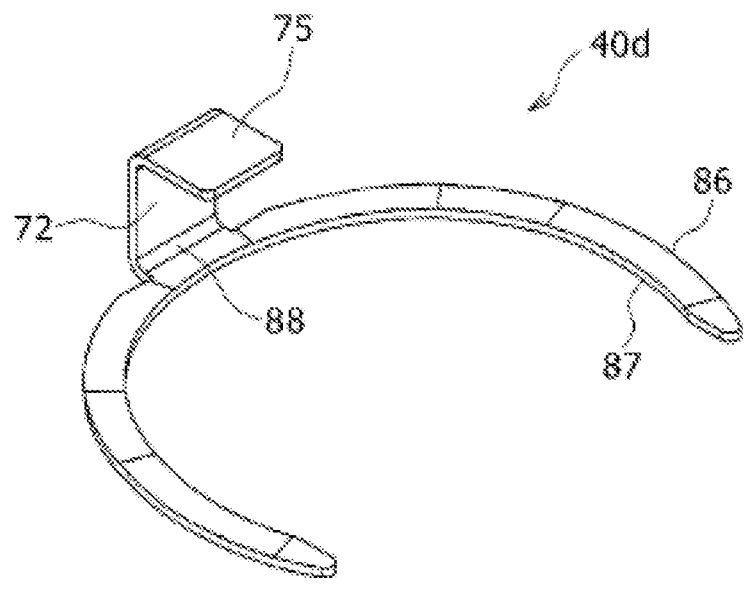
FIG. 23 is a perspective view of the auxiliary electrode of FIG. 22 as viewed from the rear side of FIG. 22.

FIG. 20 is a perspective view of an upper side portion of a battery 10d in another example (fifth example) of the embodiment. FIG. 21 is a side view of the battery 10d. FIG. 22 is a perspective view of an auxiliary electrode 40d in the battery 10d. FIG. 23 is a perspective view of the auxiliary electrode 40d of FIG. 22 as viewed from the rear side of the auxiliary electrode 40d.

In the case of this example, unlike the auxiliary electrode 40b, the auxiliary electrode 40d does not have a joint part that is connected to a lower end of an upward extension part 72 and extends below a lower end of the groove 33. In the case of this example, the auxiliary electrode 40d includes an arcuate support part 86 connected to the lower end of the upward extension part 72. The support part 86 has an arcuate plate-shaped main body part 87, and a curved surface portion 88 having an arcuate cross section connected to an outer circumferential surface at the central portion in the circumferential direction of the main body part 87. The support part 86 is connected to the lower end of the upward extension part 72 at an upper end of the curved surface portion 88. Consequently, the support part 86 is along the direction different from the upward extension part 72 by approximately 90 degrees. The support part 86 extends in the circumferential direction of the cylindrical part 30 of an outer package 16.

As illustrated in FIG. 21, a main body part 87 of the support part 86 extends in the circumferential direction while meandering on both sides in the thickness direction in the entire circumferential direction. Therefore, the main body part 87 has a wave washer shape. Consequently, when the support part 86 is inserted into the groove 33 of the outer package 16, the upper end and the lower end of the support part 86 approach the upper end and the lower end of the groove 33, respectively. At this time, the upper end and the lower end of the support part 86 may be pressed against the upper end and the lower end of the groove 33.

As illustrated in FIG. 20 and FIG. 21, the auxiliary electrode 40d is held on the outer package 16 with the support part 86 inserted into the groove 33, and in that state, the curved surface portion 88 of the auxiliary electrode 40d and an opening lower end of the groove 33 are joined as joint parts at a position indicated by the arrow P in FIG. 21, by welding.

According to the configuration of this example, the support part 86 extends in the circumferential direction while meandering, and therefore before welding the auxiliary electrode 40d, the separation of the auxiliary electrode 40d from the outer package 16 can be suppressed by the support part 86, and it becomes easy to hold the auxiliary electrode 40d on the outer package 16 while suppressing the displacement such as the inclination of the support part 86 inside the groove 33. In this example, other configurations and actions are similar to those of the auxiliary electrode 40b.

In the auxiliary electrodes 40b and 40c, similarly to the auxiliary electrode 40d, the support parts 74, 78, 81 may extend in the circumferential direction while meandering on both sides in the thickness direction.

Sixth Example of Embodiment

Figure 24:
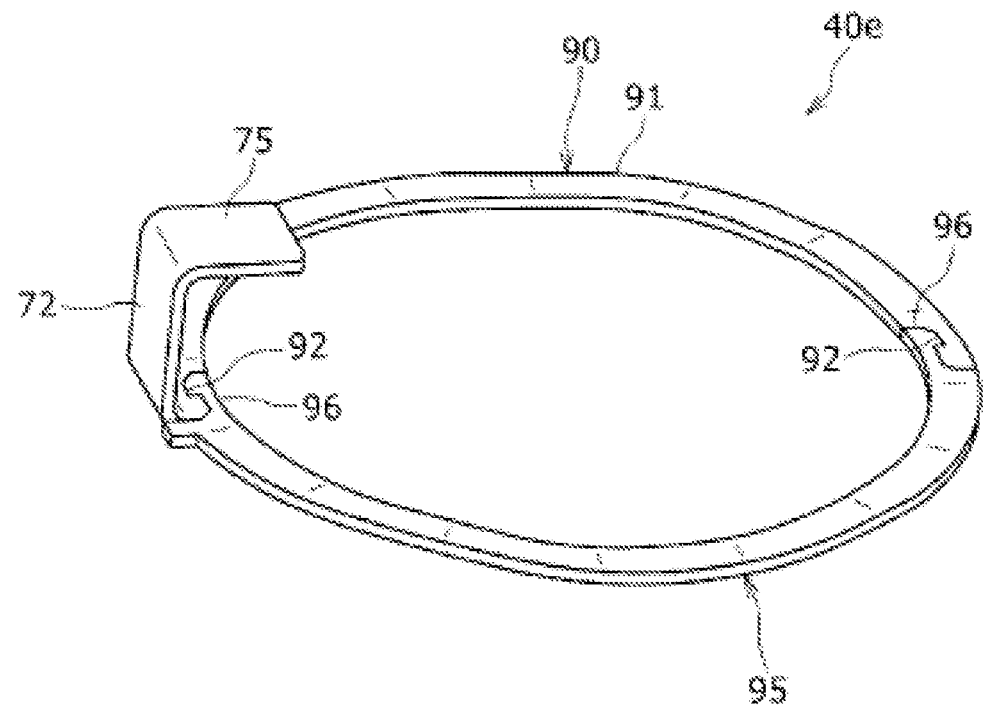
FIG. 24 is a perspective view of an auxiliary electrode taken out from a battery of another example (sixth example) of the embodiment.

FIG. 24 is a perspective view of an auxiliary electrode 40e taken out from a battery in another example (sixth example) of the embodiment. In the case of this example, the auxiliary electrode 40e has a ring shape formed by connecting two semicircular elements. Specifically, as illustrated in FIG. 24, the auxiliary electrode 40e includes a first semicircular element 90 and a second semicircular element 95. The first semicircular element 90 includes a semicircular disc-shaped first main body 91, an upward extension part 72 connected to an outer circumferential portion of one end portion in the circumferential direction (left end portion in FIG. 24) of the first main body 91, and an external connection part 75 connected to an upper end of the upward extension part 72. Respective locking grooves 92 are formed on an inner circumferential surface of both ends in the circumferential direction of the first main body 91, so that the both ends in the circumferential direction of the first main body 91 each have an approximately L-shape. The first main body 91 extends in the circumferential direction while meandering on the both sides in the thickness direction, similar to the support part 86 of the auxiliary electrode 40d.

The second semicircular element 95 has a semicircular disc shape, and is formed with approximately L-shaped protrusions 96 that protrude in the circumferential direction on the inner circumferential sides of both ends in the circumferential direction. The second semicircular element 95 also extends in the circumferential direction while meandering on both sides in the thickness direction, in the same manner as the first main body 91 of the first semicircular element 90. The auxiliary electrode 40e has a ring shape as a whole by locking tips of the two protrusions 96 of the second semicircular element 95 in the two locking grooves 92 of the first main body 91. The first main body 91 and the second semicircular element 95 each correspond to a support part.

The auxiliary electrode 40e is inserted into the groove 33 so as to approach each other from both sides in the diametrical direction of the battery in a state in which the first semicircular element 90 and the second semicircular element 95 are separated from each other, and the two protrusions 96 of the semicircular element 95 are locked in the two locking grooves 92 of the first semicircular element 90 to connect the first semicircular element 90 and the second semicircular element 95. In this state, the auxiliary electrode 40e is held on an outer package 16. In that state, a connection part between the first main body 91 of the first semicircular element 90 of the auxiliary electrode 40e and the upward extension part 72, or an end portion on the upward extension part 72 side of the second semicircular element 95, and an opening lower end portion of the groove 33 are joined by welding in the same manner as the auxiliary electrode 40d.

According to the configuration of this example, the ring-shaped portion of the auxiliary electrode 40e is disposed inside the entire circumference of the groove 33, and therefore the separation of the auxiliary electrode 40e in the radial direction with respect to the outer package 16 can be suppressed compared to the auxiliary electrode 40d before welding the auxiliary electrode 40e. At the same time, the auxiliary electrode 40e can be more easily held on the outer package 16. In this example, other configurations and actions are similar to those of the auxiliary electrode 40d.

In each of the above examples, the external connection part 47, 69, 75 or 84 of the auxiliary electrode 40, 40a, 40b, 40c, 40d or 40e extends so as to face the upper end portion 37 of the outer package 16, but may be extend to the side opposite to the upper end portion 37 of the outer package 16. The external connection part 47, 69, 75 or 84 may be located below the upper end of the outer package 16.

Further, as in each of the configurations of FIG. 1 to FIG. 5 or the configuration of FIG. 6 and FIG. 7, in the configuration in which the downward extension part (the downward extension part 49, the first downward extension part 58) of the first joint part (the joint part 41, the first joint part 55) has the first bent part 51 or 60, and the first bent part is joined to the groove 33, or in the configuration in which the second downward extension part 65 of the second joint part 62 has the second bent part 67, and the second bent part is connected to the groove 33, the auxiliary electrode may extend in the circumferential direction of the cylindrical part 30, and may have at least one support part to be inserted into the groove 33.

In the configuration of each of the above examples, the case where the outer package 16 is a negative electrode terminal and the sealing assembly 17 is a positive electrode terminal is described, but the outer package 16 may be a positive electrode terminal and the sealing assembly 17 may be a negative electrode terminal. In this case, the first electrode is a positive electrode and the second electrode is a negative electrode.

REFERENCE SIGNS LIST 10, 10a, 10b, 10c, 10d battery, 11 positive electrode, 12 negative electrode, 13 separator, 14 electrode assembly, 16 outer package, 17 sealing assembly, 18a, 18b insulating plate, 19 positive electrode lead, 20a, 20b negative electrode lead, 22 filter, 23 lower vent member, 24 insulating member, 25 upper vent member, 26 cap, 27 gasket, 30 cylindrical part, 31 open end, 32 bottom, 33 groove, 37 upper end portion, 40, 40a, 40b, 40c, 40d, 40e auxiliary electrode, 41 joint part, 45 upward extension part, 47 external connection part, 49 downward extension part, 50 first cutout, 51 first bent part, 55 first joint part, 57 first upward extension part, 58 first downward extension part, 59 first cutout, 60 first bent part, 62 second joint part, 64 second upward extension part, 65 second downward extension part, 66 second cutout, 67 second bent part, 69 external connection part, 70 joint part, 72 upward extension part, 73 cutout, 74 support part, 75 external connection part, 76 intermediate material, 77 first joint part, 78 first support part, 79 first upward extension part, 80 second joint part, 81 second support part, 82 second upward extension part, 84 external connection part, 85 intermediate material, 86 support part, 87 main body part, 88 curved surface portion, 90 first semicircular element, 91 first main body, 92 locking groove, 95 second semicircular element, 96 protrusion, 100 conductive member, 101 holding member, 102 main body part, 103 box part, 104 holding hole, 105 horn.

The invention claimed is:

1. A battery, comprising:
an electrode assembly obtained by winding a first electrode and a second electrode with a separator therebetween;
an outer package that has a cylindrical part having a cylindrical shape, an open end formed at one end of the cylindrical part, and a bottom closing the other end of the cylindrical part, and that stores the electrode assembly therein, and that is electrically connected to the first electrode;
a sealing assembly that closes the open end of the outer package together with a gasket, and is electrically connected to the second electrode; and
an auxiliary electrode having a first joint part that is welded to an outer circumferential surface of the cylindrical part, a plate-shaped first upward extension part that extends from the first joint part toward the open end, and a plate-shaped external connection part that extends from the first upward extension part in a direction different from a direction of the first upward extension part, and is connected to another conductive member, wherein
the cylindrical part has a groove having the outer circumferential surface dented so as to protrude an inner circumferential surface of the cylindrical part,
the sealing assembly is disposed on the groove with the gasket therebetween, and
the first joint part is joined to at least one of a portion of an inside of the groove, on a side nearer to the bottom than a valley position of the groove, and a portion of the outer circumferential surface of the cylindrical part located between the groove and the electrode assembly in a winding axis direction of the electrode assembly.

2. The battery according to claim 1, wherein
the first joint part has a downward extension part that is continuous from an end on a side of the electrode assembly of the first upward extension part, and extends to a portion beyond a lower end of the groove,
a first cutout is formed in a portion of the downward extension part facing the groove,
the downward extension part has a first bent part that is adjacent to the first cutout, and bent on a side of the outer package, and
the first bent part is joined to the groove.

3. The battery according to claim 2, wherein
the first cutout has a U-shape in which a side of the electrode assembly is open, and
the first bent part is disposed in a portion surrounded by the first cutout in the downward extension part.

4. The battery according to claim 1, wherein
the auxiliary electrode has a second joint part that is welded away from the first joint part in a circumferential direction of the cylindrical part of the outer package, and a second upward extension part that extends from the second joint part toward the open end, and
the first upward extension part and the second upward extension part are connected at two positions separated in the circumferential direction of the external connection part.

5. The battery according to claim 2, wherein
the auxiliary electrode has a second joint part that is joined apart from the first joint part in a circumferential direction of the cylindrical part of the outer package, and a second upward extension part that extends from the second joint part toward the open end,
the first upward extension part and the second upward extension part are connected at two positions separated in the circumferential direction of the external connection part,
the second joint part has a second downward extension part that is continuous from an end on a side of the electrode assembly of the second upward extension part, and extends to a portion beyond a lower end of the groove, a second cutout is formed in a portion of the second downward extension part facing the groove, the second downward extension part has a second bent part that is adjacent to the second cutout, and bent toward the outer package, and the second bent part is joined to the groove.

6. The battery according to claim 5, wherein the second cutout has a U-shape in which a side of the electrode assembly is open, and the second bent part is disposed in a portion surrounded by the second cutout in the second downward extension part.

7. The battery according to claim 1, wherein the auxiliary electrode has at least one support part that extends in a circumferential direction of the cylindrical part and is inserted into the groove.

* * * * *